(12) United States Patent
Miyoshi et al.

(10) Patent No.: US 12,334,787 B2
(45) Date of Patent: Jun. 17, 2025

(54) STATOR FOR ROTARY ELECTRIC MACHINE

(71) Applicant: AISIN CORPORATION, Aichi (JP)

(72) Inventors: Yoichi Miyoshi, Kariya (JP); Toshio Sugiyama, Kariya (JP)

(73) Assignee: AISIN CORPORATION, Kariya (JP)

( * ) Notice: Subject to any disclaimer, the term of this patent is extended or adjusted under 35 U.S.C. 154(b) by 213 days.

(21) Appl. No.: 17/908,294

(22) PCT Filed: Mar. 30, 2021

(86) PCT No.: PCT/JP2021/013714
§ 371 (c)(1),
(2) Date: Aug. 31, 2022

(87) PCT Pub. No.: WO2021/240989
PCT Pub. Date: Dec. 2, 2021

(65) Prior Publication Data
US 2023/0093998 A1 Mar. 30, 2023

(30) Foreign Application Priority Data

May 26, 2020 (JP) .................................. 2020-091786
Feb. 1, 2021 (JP) .................................. 2021-014310

(51) Int. Cl.
*H02K 3/28* (2006.01)
(52) U.S. Cl.
CPC ...................................... *H02K 3/28* (2013.01)
(58) Field of Classification Search
CPC ........................................................ H02K 3/28

(Continued)

(56) References Cited

U.S. PATENT DOCUMENTS 3,728,567 A * 4/1973 Picmaus ............... H02K 3/28
                                                      310/198
6,114,790 A * 9/2000 Fei ........................ H02K 3/28
                                                      310/180

(Continued)

FOREIGN PATENT DOCUMENTS

JP    2011-177012 A    9/2011
JP    2018-182963 A    11/2018

(Continued)

OTHER PUBLICATIONS

Jun. 8, 2021 International Search Report issued in International Patent Application No. PCT/JP2021/013714.

(Continued)

*Primary Examiner* — Alexander Talpalatski
(74) *Attorney, Agent, or Firm* — Oliff PLC

(57) ABSTRACT

A stator for a rotary electric machine, including a stator core having a plurality of slots, and a multi-phase stator coil wound around the stator core by double-layer winding. The multi-phase stator coil is formed by winding a plurality of double-wound coils around an entire circumference of the stator core for each phase, each of the double-wound coils being wound concentrically with different circumferential lengths. Each of the double-wound coils is formed of a coil portion having a larger circumferential length and a coil portion having a smaller circumferential length. In one of the double-wound coils, a total number of coils inserted into the plurality of slots for the coil portion having the larger circumferential length and a total number of coils inserted into the plurality of slots for the coil portion having the smaller circumferential length are equal to each other.

5 Claims, 27 Drawing Sheets

(58) Field of Classification Search
USPC .......................................................... 310/208
See application file for complete search history.

(56) References Cited

U.S. PATENT DOCUMENTS

| | | | |
|---|---|---|---|
| 6,170,974 B1 | 1/2001 | Hyypio | |
| 10,998,791 B2* | 5/2021 | Kuroyanagi | H02K 3/28 |
| 11,496,007 B2* | 11/2022 | Xu | H02P 25/22 |
| 2015/0091408 A1* | 4/2015 | Azusawa | H02K 3/12 |
| | | | 310/208 |
| 2015/0155761 A1* | 6/2015 | Richard | H02K 11/33 |
| | | | 310/68 D |
| 2018/0301950 A1* | 10/2018 | Adachi | H02K 3/12 |

FOREIGN PATENT DOCUMENTS

| | | | |
|---|---|---|---|
| JP | 6582973 B2 | 10/2019 | |
| JP | 6682956 B2 | 4/2020 | |

OTHER PUBLICATIONS

Jul. 21, 2023 Extended European Search Report issued in European Patent Application No. 21813649.7.

* cited by examiner

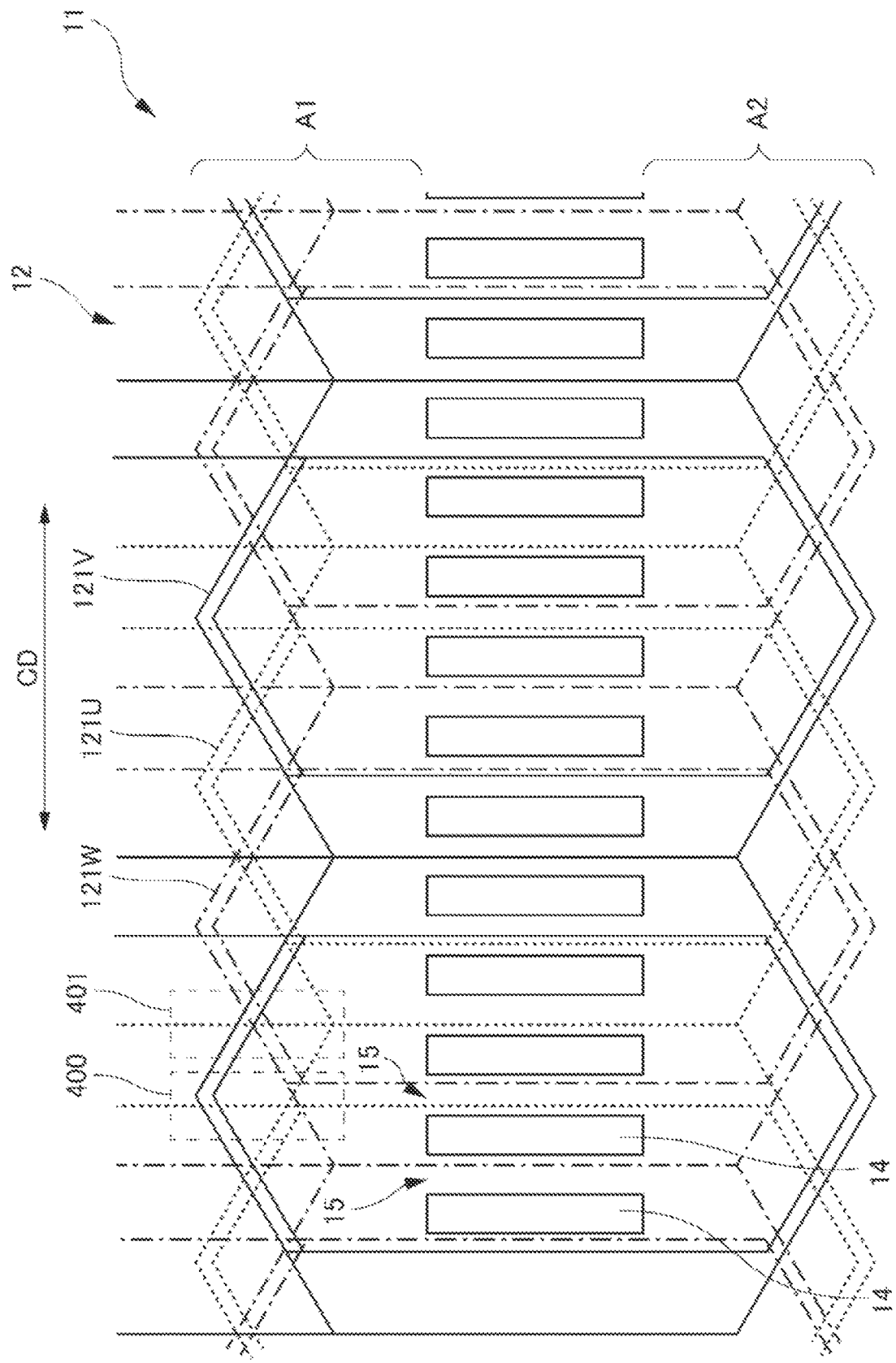

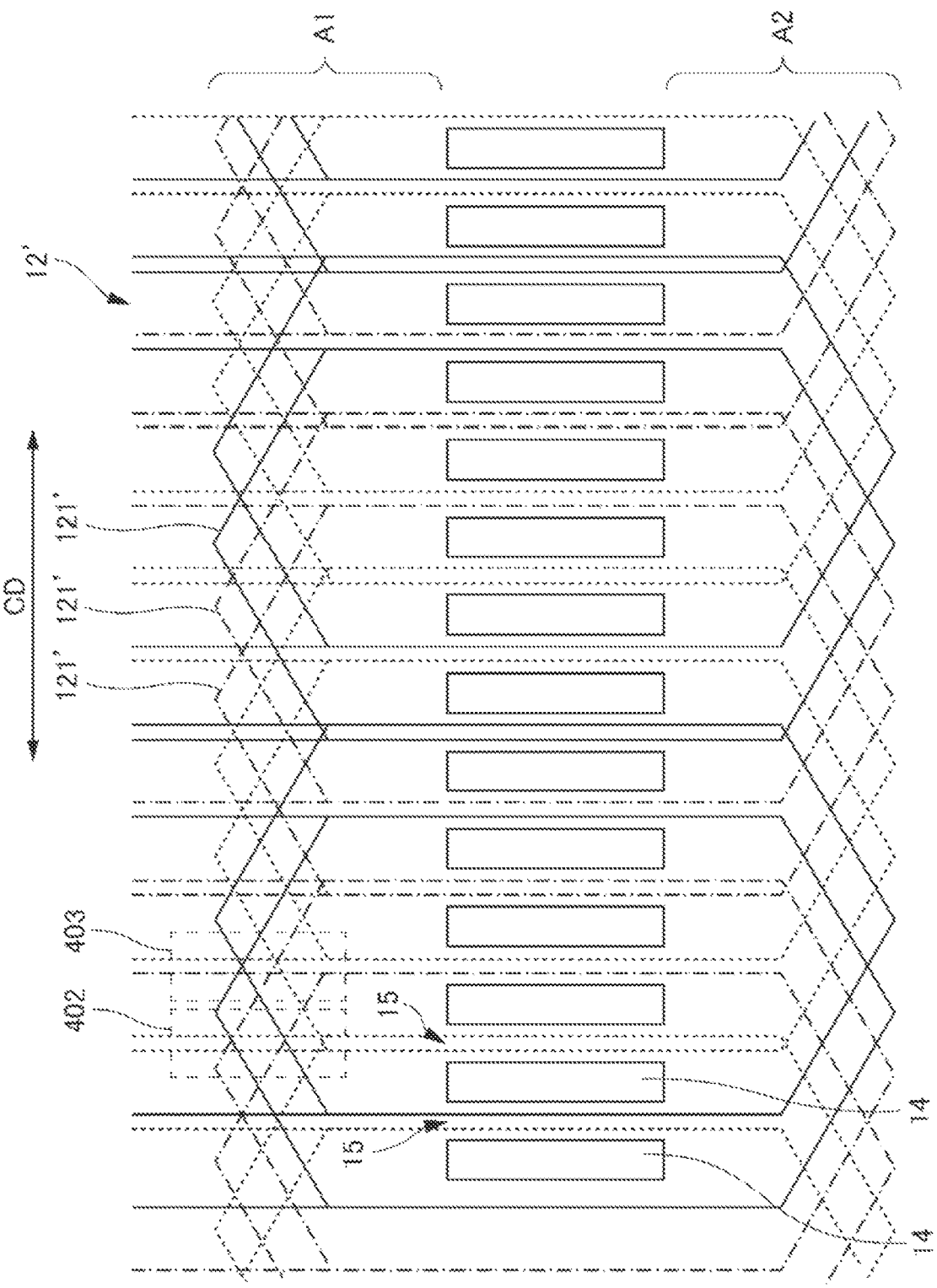

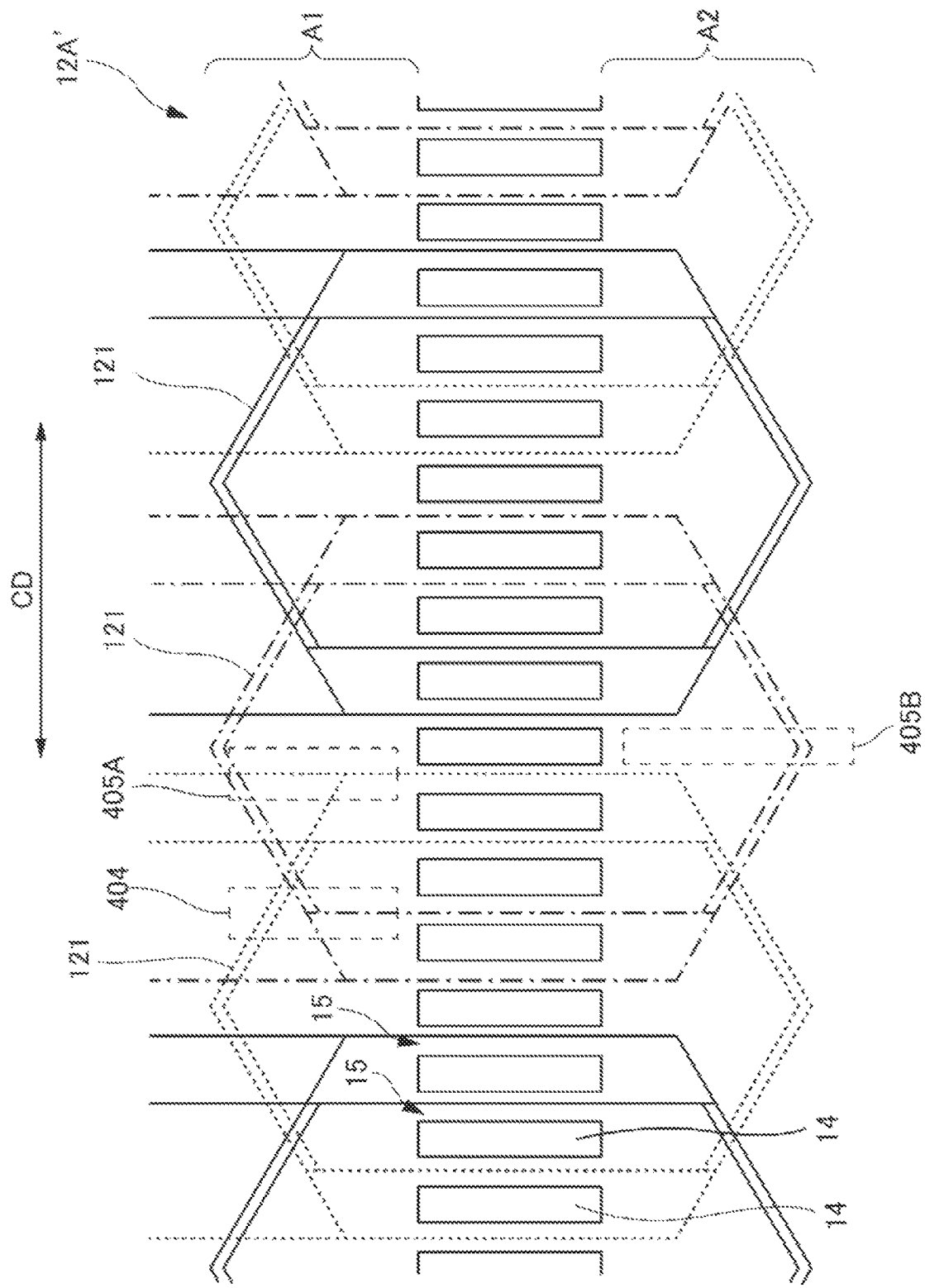

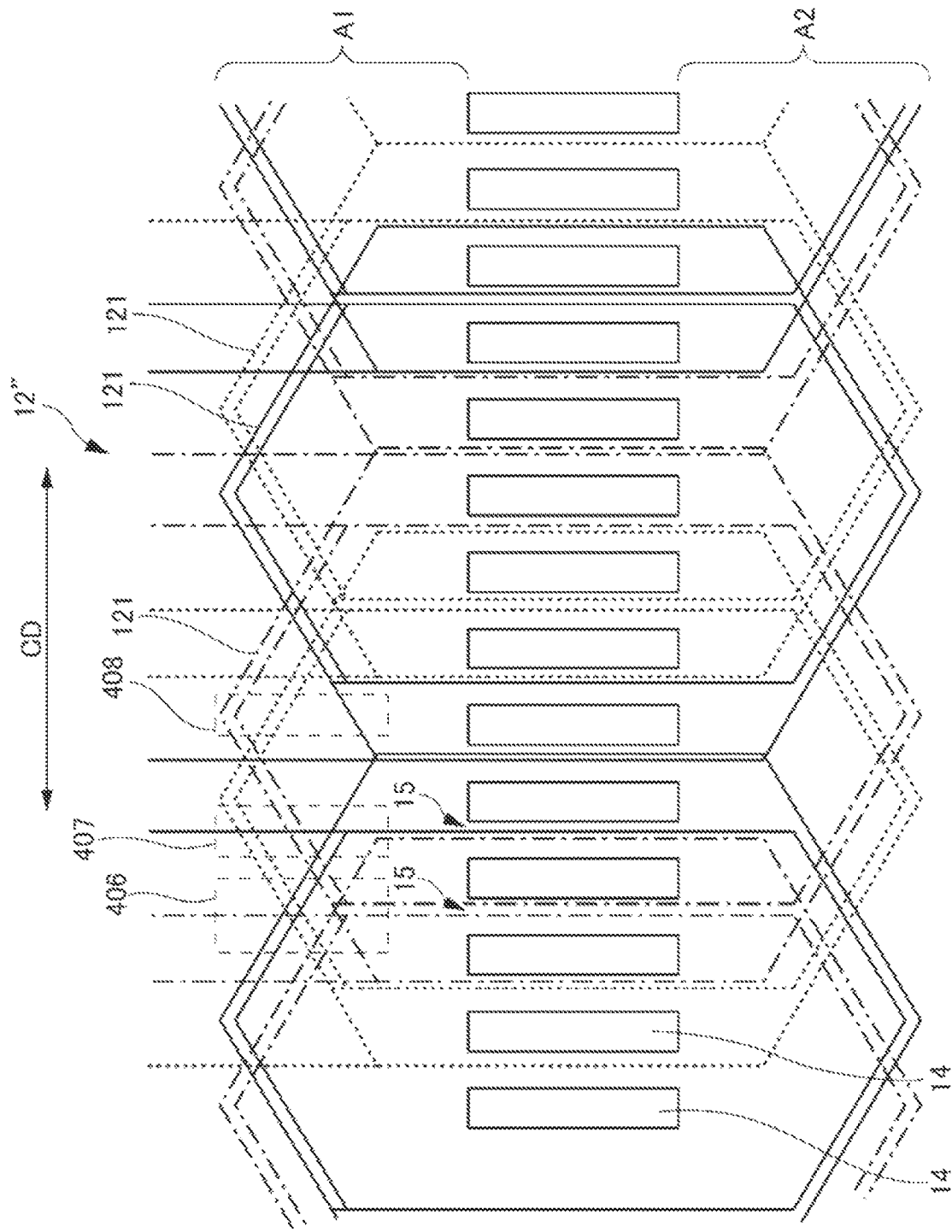

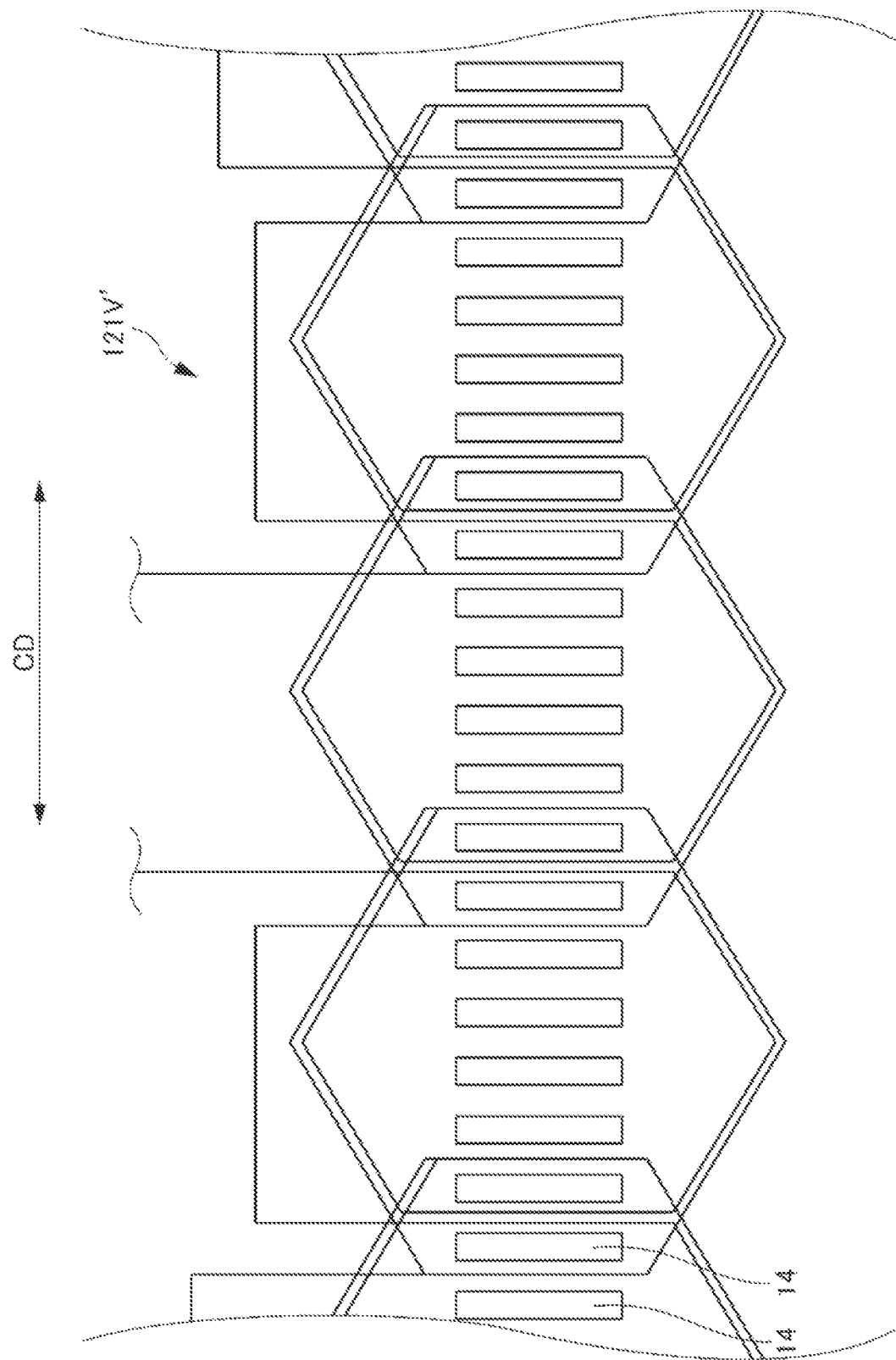

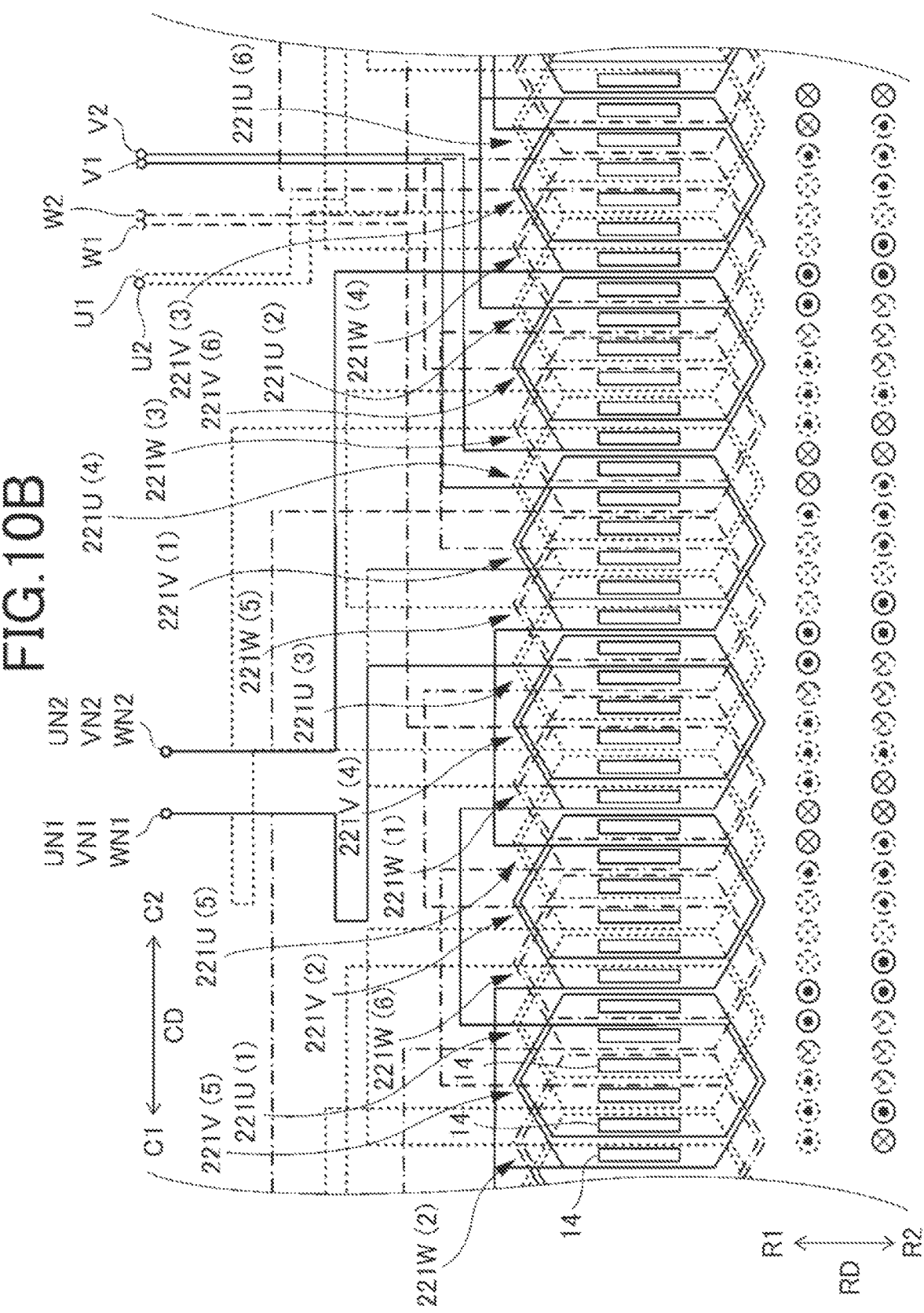

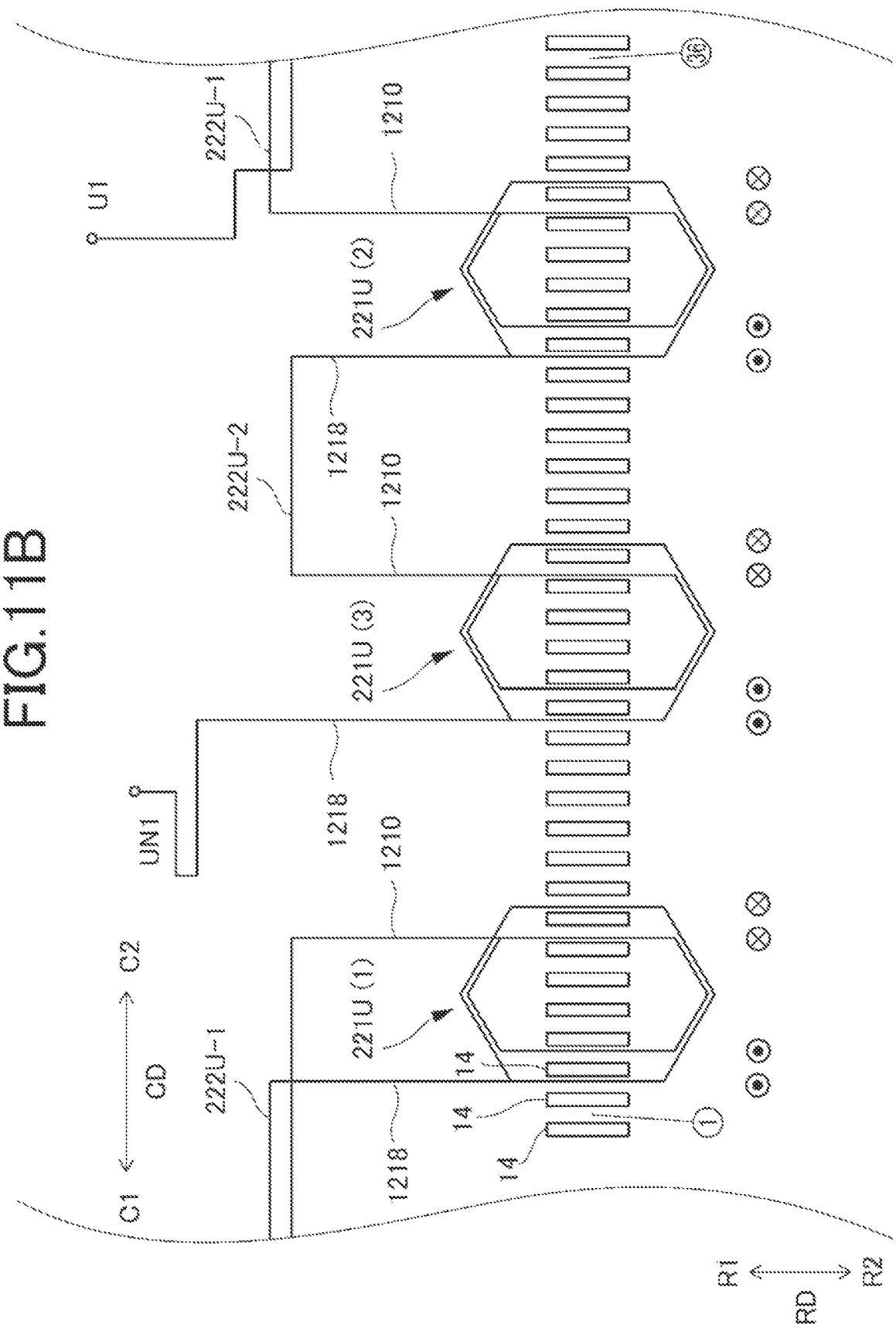

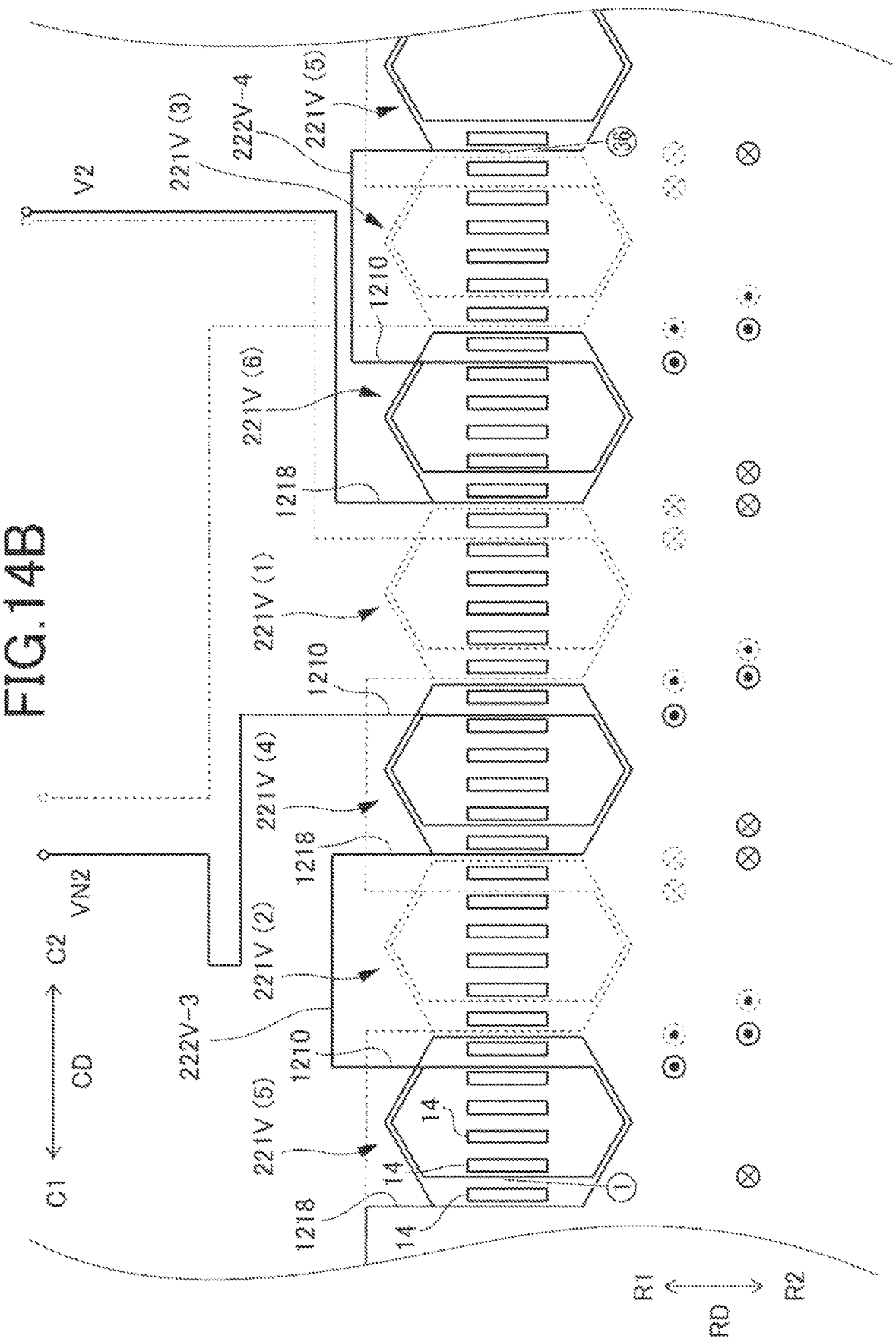

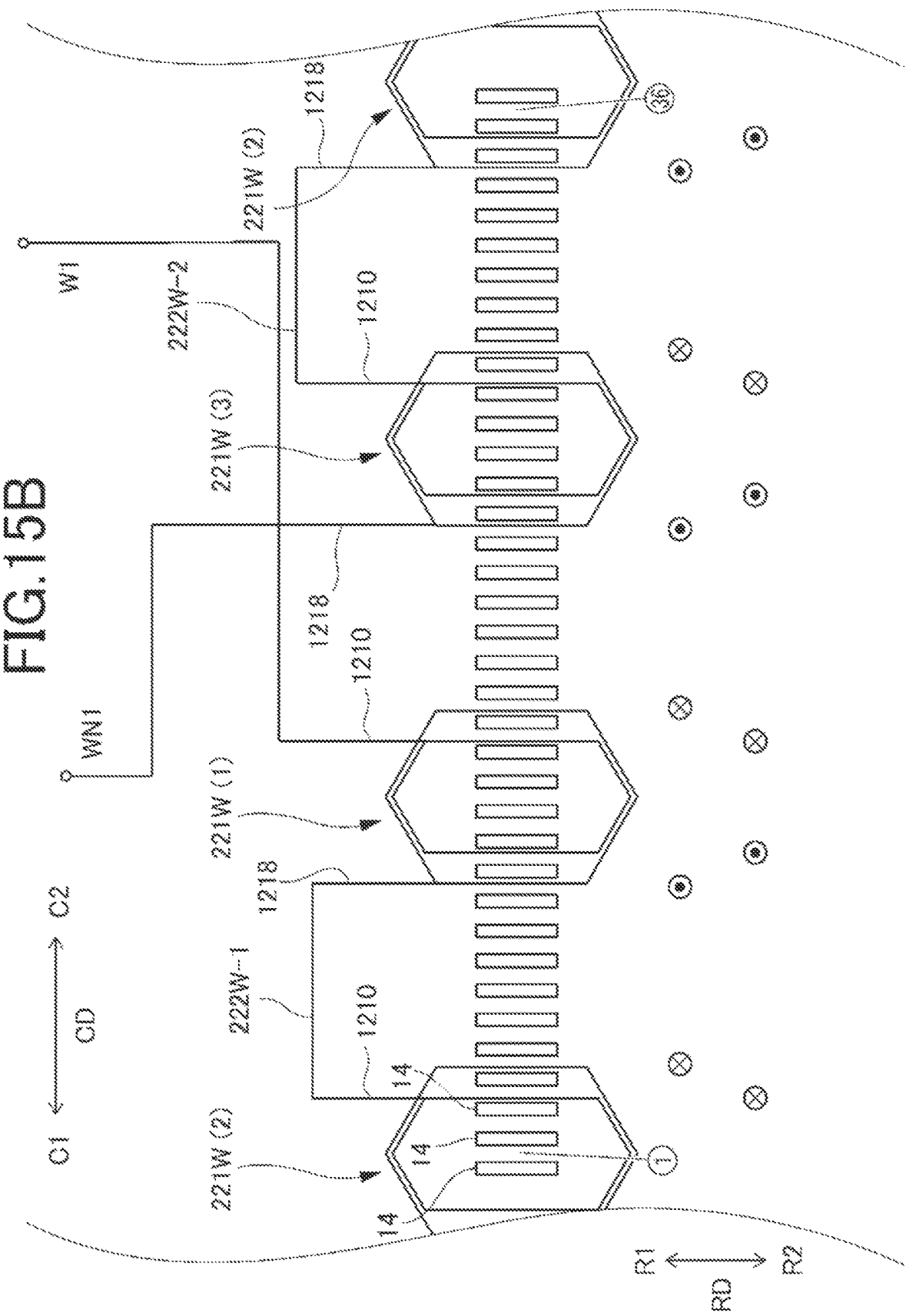

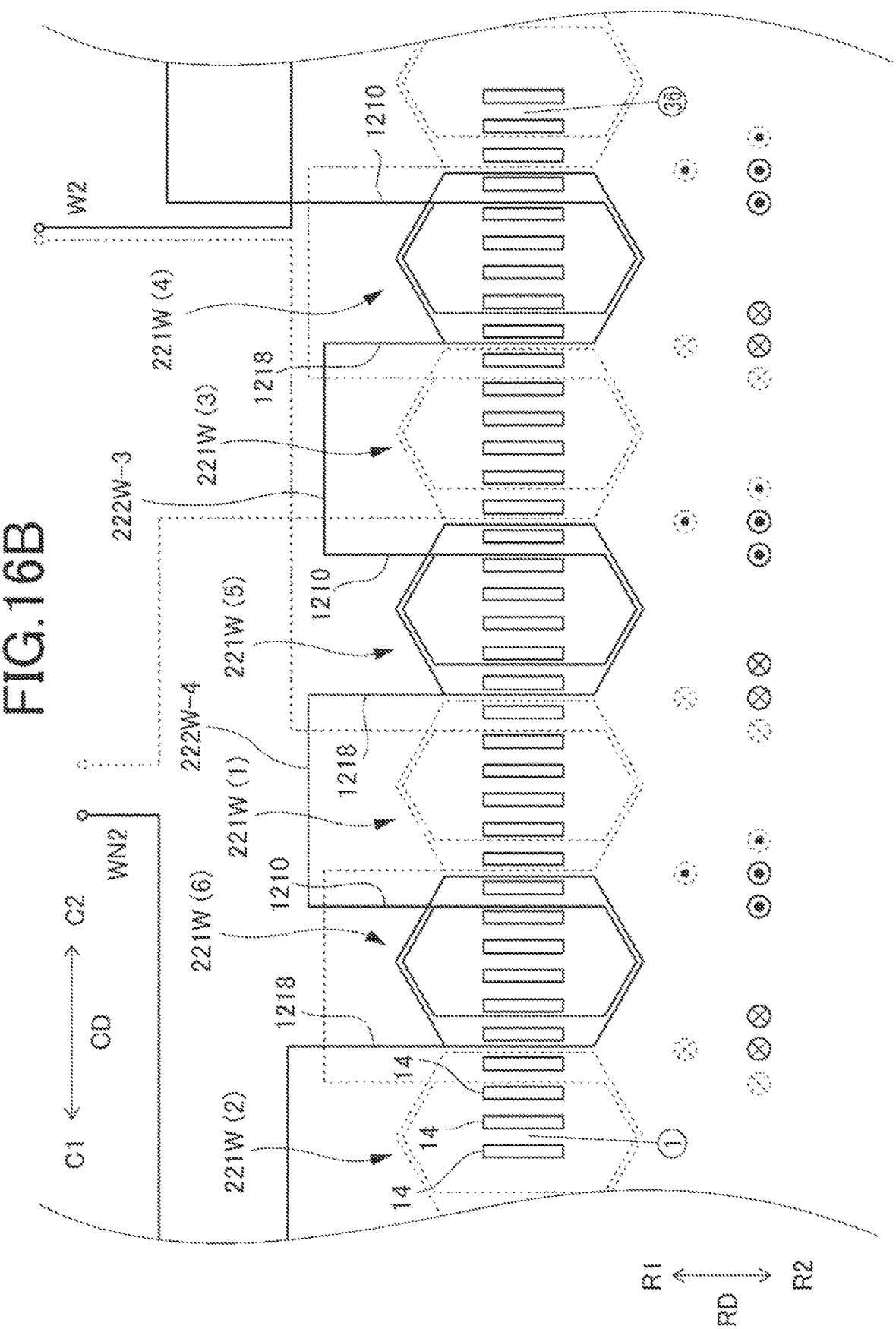

US 12,334,787 B2

STATOR FOR ROTARY ELECTRIC MACHINE

TECHNICAL FIELD

The present disclosure relates to a stator for a rotary electric machine.

BACKGROUND ART

There is known a stator for a rotary electric machine in which a plurality, of coil wires of different phases is arranged to overlap each other in a circumferential direction in a part of a plurality of slots.

RELATED ART DOCUMENTS

Patent Documents

Patent Document 1: Japanese Unexamined Patent Application Publication No. 2018-182963 (JP 2018-182963 A)

SUMMARY OF THE DISCLOSURE

Problem to be Solved by the Disclosure

In the related art described above, however, double-wound coil portions and single-wound coil portions are alternately arranged in the circumferential direction for each phase. Therefore, problems arise in that the number of types of coils forming a stator coil increases and the winding method is complicated.

In one aspect, the present disclosure has an object to reduce spatial harmonics while utilizing one type of double-wound coil.

Means for Solving the Problem

One aspect of the present disclosure provides a stator for a rotary electric machine, including
a stator core having a plurality of slots; and
a multi-phase stator coil wound around the stator core by double-layer winding.
The multi-phase stator coil is formed by winding a plurality of double-wound coils around an entire circumference of the stator core for each phase, each of the double-wound coils being wound concentrically with different circumferential lengths.
Each of the double-wound coils is formed of a coil portion having a larger circumferential length and a coil portion having a smaller circumferential length.
In one of the double-wound coils, a total number of coils inserted into the plurality of slots for the coil portion having the larger circumferential length and a total number of coils inserted into the plurality of slots for the coil portion having the smaller circumferential length are equal to each other.

Effects of the Disclosure

In the one aspect, according to the present disclosure, it is possible to reduce the spatial harmonics while utilizing one type of double-wound coil.

BRIEF DESCRIPTION OF THE DRAWINGS

FIG. 4A is an explanatory diagram of a coil end configuration of a stator coil of the present embodiment.

FIG. 4B is a diagram showing a part of an inner peripheral portion of a stator according to a first comparative example developed in a plane.

FIG. 5B is a diagram showing a part of an inner peripheral portion of a stator according to the second comparative example developed in a plane.

FIG. 5C is a diagram showing a part of an inner peripheral portion of a stator according to a modified example developed in a plane.

FIG. 5D is a diagram showing a part of an inner peripheral portion of a stator according to another modified example developed in a plane.

FIG. 10B is an explanatory diagram of the method for assembling the stator coil according to the second embodiment, showing an inner peripheral portion of the stator developed in a plane.

FIG. 11B is a developed view illustrating the assembling step for the first double-wound coil of the U phase according to the second embodiment.

FIG. 14B is a developed view illustrating the assembling step for the second double-wound coil of the V phase according to the second embodiment.

FIG. 15B is a developed view illustrating the assembling step for the first double-wound coil of the W phase according to the second embodiment.

FIG. 16B is a developed view illustrating the assembling step for the second double-wound coil of the W phase according to the second embodiment.

MODES FOR CARRYING OUT THE DISCLOSURE

Hereinafter, each embodiment will be described in detail with reference to the accompanying drawings.

FIRST EMBODIMENT

Figure 1:
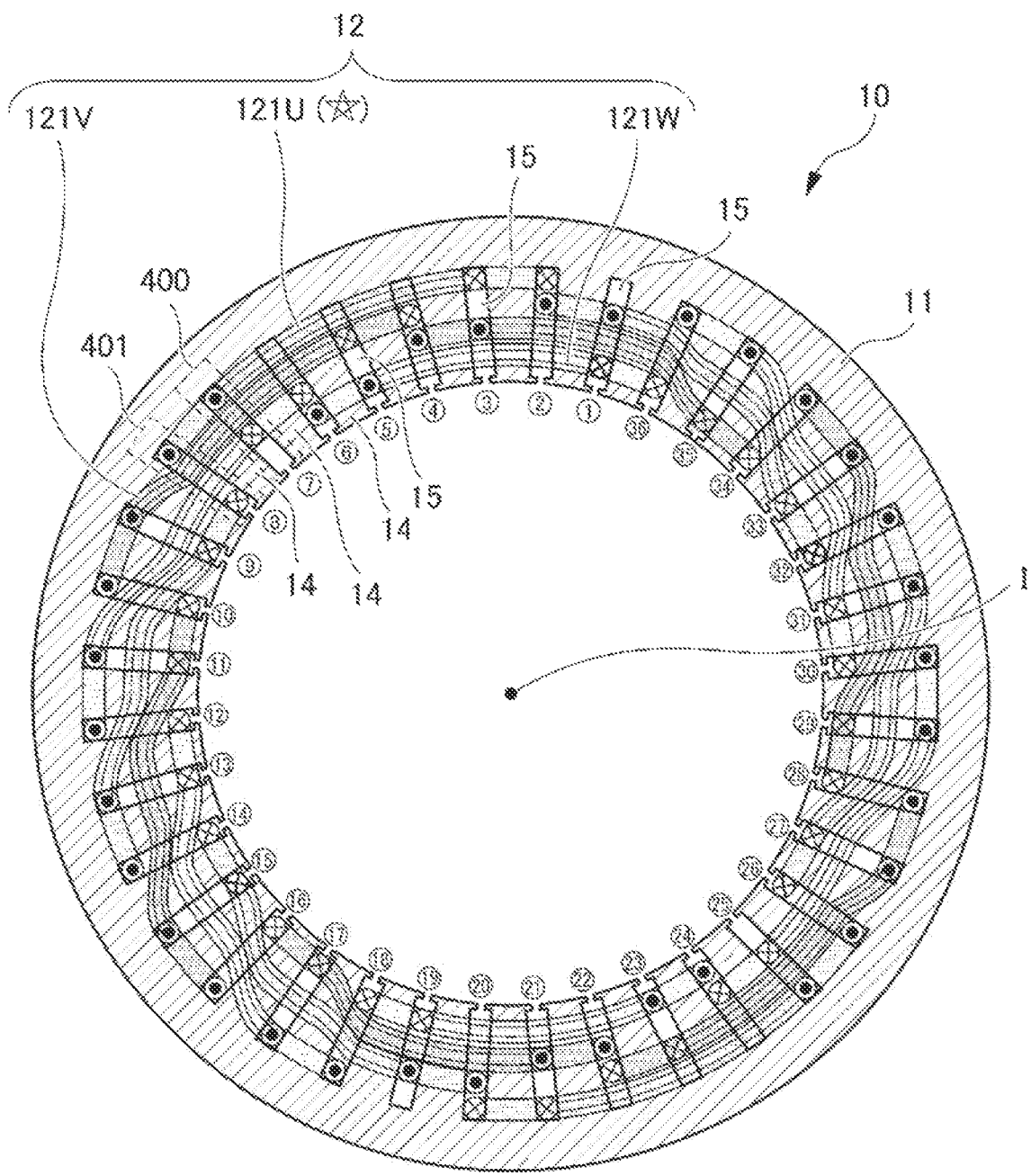
FIG. 1 is a sectional view of a stator for a rotary electric machine according to a first embodiment.

FIG. 1 is a sectional view of a stator 10 for a rotary electric machine according to an embodiment (first embodiment). In the following description, an axial direction refers to a direction in which a rotation axis (rotation center) I of the rotary electric machine extends, and a radial direction refers to a radial direction centered on the rotation axis I. Therefore, a radially outer side refers to a side away from the rotation axis I, and a radially inner side refers to a side toward the rotation axis I. Further, a circumferential direction corresponds to a rotation direction around the rotation axis I, In addition, in FIG. 1 and the like, for making the figures easy to see, reference symbols may be given only to a part of a plurality of parts having the same attribute.

FIG. 1 shows a cross section of the stator 10 cut in a cross section perpendicular to the axial direction. In FIG. 1 (the same applies to FIG. 2 and the like described later), each coil portion inserted in a slot 15 (slot insertion portion) is marked with a symbol "x" in a circle or "small ●" in a circle. This difference in the symbol corresponds to a difference in a direction of a current flow during energization (that is, a direction through a paper surface in the axial direction or a direction away from the paper surface).

The rotary electric machine is an inner rotor type, and the stator 10 is provided to surround a radially outer side of a rotor (not shown). The rotary electric machine may be, for example, a vehicle driving motor to be used in a hybrid vehicle or an electric vehicle. However, the rotary electric machine may be used for any other purpose.

The stator 10 includes a stator core 11 and a stator coil 12.

The stator core 11 may be formed of, for example, annular magnetic stacked steel sheets. Teeth 14 protruding radially inward are radiately formed on an inner peripheral portion of the stator core 11. The plurality of teeth 14 defines a plurality of slots 15 between the teeth 14 adjacent in the circumferential direction. The number of teeth 14 and the number of slots 15 associated therewith are arbitrary. In the present embodiment, 36 teeth 14 and 36 slots 15 are provided as an example. In FIG. 1, numerals 1 to 36 are shown in circles in association with the 36 slots 15. In the following, a specific slot 15 is represented by "slot 15-k" (k=1 to 36). For example, a slot 15-1 represents a slot 15 associated with a circle enclosing the number "1". In the following, "k" is also referred to as "slot number". In the present embodiment, a three-phase, six-pole, 36-slot rotary electric machine is used as an example. The numbers of these elements may be changed as appropriate. In the case of three phases, six poles, and 36 slots, six slots correspond to a coil pitch for full-pitch winding. Therefore, five slots or less correspond to a coil pitch for short-pitch winding, and seven slots or more correspond to a coil pitch for long-pitch winding.

The stator coil 12 is wound around the teeth 14 of the stator core 11 (that is, in the slots 15). The stator coil 12 is wound around the stator core 11 by double-layer winding. For example, the stator coil 12 may be electrically connected at a neutral point of star connection or may be electrically connected by delta connection in one or more parallel relationships.

In the double-layer winding, a change (distribution) in a magnetomotive force depending on a change in an angle can be made relatively gentle (because the waveform of the magnetomotive force can be made closer to a sine wave). Therefore, the spatial harmonics can be reduced. That is, NV (Noise Vibration) performance is m proved.

In the present embodiment, the stator coil 12 is formed of double-wound coils 121U, 121V, and 121W that are wound concentrically with different circumferential lengths for a U phase; a V phase, and a W phase. The double-wound coil 121U is for the U phase. In the present embodiment, six double-wound coils 121U are provided. Similarly, the double-wound coil 121V is for the V phase, and six double-wound coils 121V are provided. The double-wound coil 121W is for the W phase, and six double-wound coils 121W are provided. In the following, when the phases of the double-wound coils 121U, 121V, and 121W are not distinguished, they are simply referred to as "double-wound coils 121".

One double-wound coil 121 includes two concentric coil portions having a substantially hexagonal shape when viewed in the radial direction. In the two coil portions, the coil portion having a larger circumferential length (length in the circumferential direction) is hereinafter referred to also as "outer cassette coil portion", and the coil portion having a smaller circumferential length is hereinafter referred to also as "inner cassette coil portion". A preferred example of the double-wound coil 121 will be described later with reference to FIG. 6.

One double-wound coil 121 is inserted into four slots 15. That is, the outer cassette coil portion is inserted into two slots 15, and the inner cassette coil portion is inserted into the other two slots 15. Hereinafter, the number of coils defined such that the substantially hexagonal coil portion inserted into two slots 15 is "one (unit)" is used as a unit representing the number of coils. In this case, one double-wound coil 121 having a substantially hexagonal shape in two layers has two coils.

Specifically, the outer cassette coil portion of one double-wound coil 121 is inserted into a pair of slots 15 on an outer side in the circumferential direction, and the inner cassette coil portion of the double-wound coil 121 is inserted into a pair of slots 15 on an inner side in the circumferential direction. In this case, the pair of slots 15 on the outer side in the circumferential direction sandwiches five slots 15 in the circumferential direction (that is, the outer cassette coil portion is long-pitch winding). That is, the outer cassette portion of one double-wound coil 121 is arranged over seven slots 15 in the circumferential direction. The pair of slots 15 on the inner side in the circumferential direction sandwiches three slots 15 in the circumferential direction (that is, the inner cassette coil portion is short-pitch winding). That is, the inner cassette coil portion of one double-wound coil 121 is arranged over five slots 15 in the circumferential direction. In this case, the circumferential length of the outer cassette coil portion is a circumferential length of seven slots, and the circumferential length of the inner cassette coil portion is a circumferential length of five slots, which correspond to the respective coil pitches.

For example, in the six double-wound coils 121U, one double-wound coil 121U associated with a star mark in FIG. 1 includes an outer cassette coil portion inserted into a pair of slots 15-2 and 15-8 on the outer side in the circumferential direction, and an inner cassette coil portion inserted into a pair of slots 15-3 and 15-7 on the inner side in the circumferential direction. In this case, the circumferential center of the pair of slots 15-2 and 15-8 on the outer side in the circumferential direction coincides with the circumferential center of the pair of slots 15-3 and 15-7 on the inner side in the circumferential direction. The center is a position of a slot 15-5. The above is basically the same for the other double-wound coils 1211) and for the double-wound coils 121V and 121W. That is, the double-wound coils 121U, 121V, and 121W have only the following differences. The double-wound coils 121U, 121V, and 121W are arranged in such a manner that the U phase, the V phase, and the W phase are shifted in the circumferential direction by 120° in terms of electrical angle, and may be offset (skewed) in the radial direction at crossover wires.

Next, the configuration of the stator coil 12 will be described in more detail with reference to FIG. 2 and subsequent figures together with FIG. 1.

Figure 2:
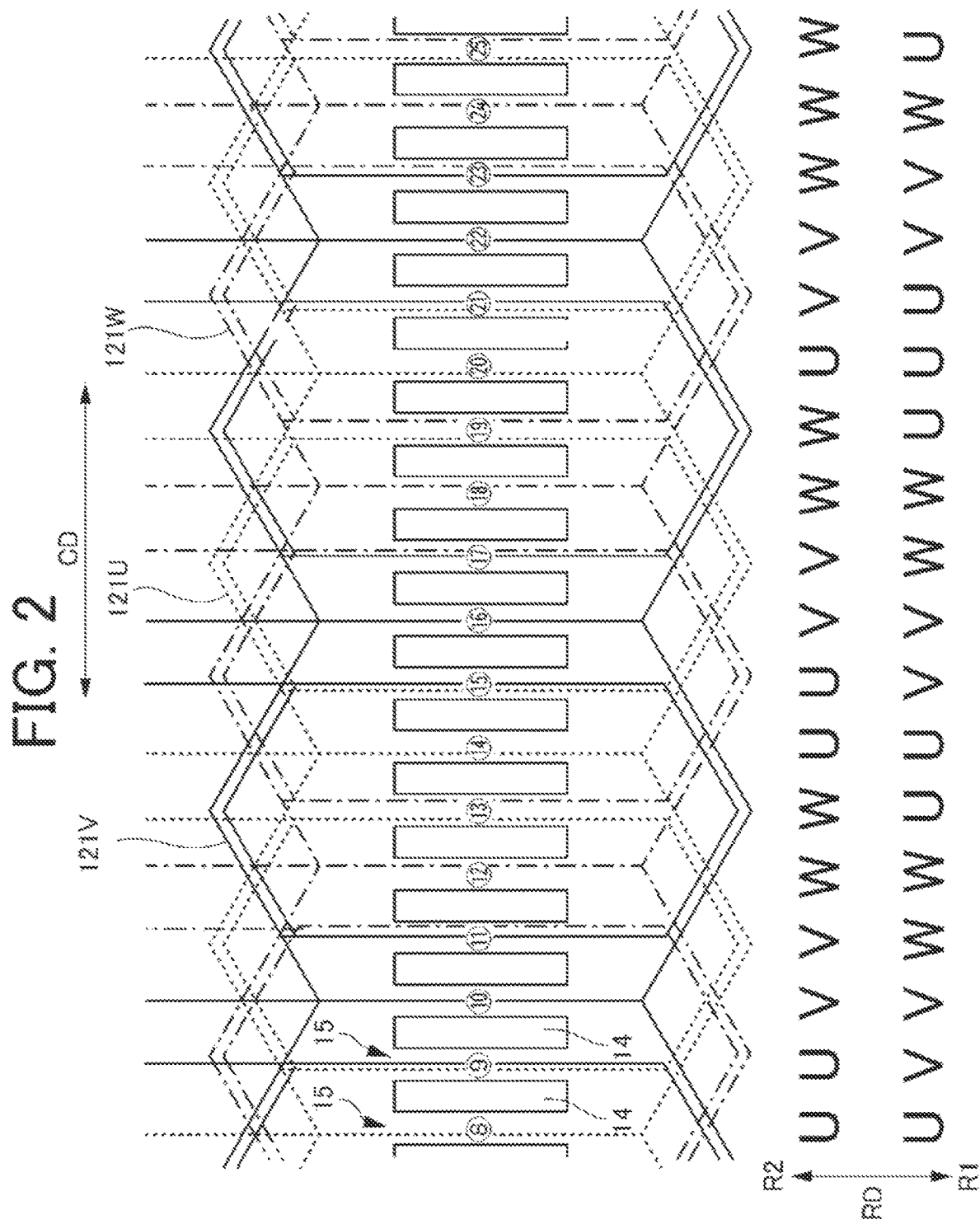
FIG. 2 is a diagram showing a part of an inner peripheral portion of a stator 10 developed in a plane.
Figure 3:
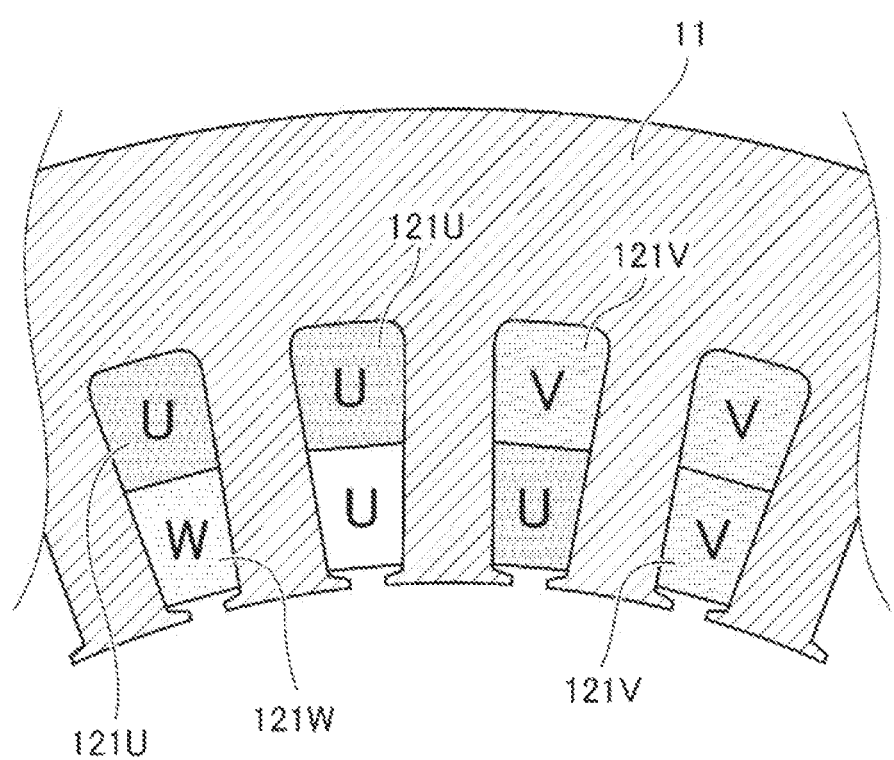
FIG. 3 is a simplified sectional view of a part of the stator 10.

FIGS. 2 and 3 are explanatory diagrams of double-layer winding related to the stator coil 12 of the present embodiment. FIG. 2 is a diagram showing a part of an inner peripheral portion of the stator 10 developed in a plane. FIG. 3 is a simplified sectional view of a part of the stator 10. In FIG. 2, a direction CD corresponds to the circumferential direction. In FIG. 2, the slot numbers shown in FIG. 1 are associated with the corresponding slots 15. Inserted coil portions (slot insertion portions herein) related to any of the three phases are shown below each slot 15. An R1 side in a direction RD indicates phases of coil portions inserted on the radially outer side, and an R2 side in the direction RD indicates phases of coil portions inserted on the radially inner side. The same applies to FIGS. 10B, 11B, 12B, and the like described later.

In FIG. 2, the double-wound coils 121U, 121V, and 121W are schematically shown by different line types. As shown in FIG. 2, one double-wound coil 121U and another double-wound coil 121U are inserted into the slot 15-8, and the one double-wound coil 121U and one double-wound coil 121V are inserted into a slot 15-9. The same applies hereinafter. According to such double-layer winding, the spatial harmonics can be reduced effectively as described above.

Particularly in the present embodiment, in the double-wound coils 121U, 121V, and 121W, a pair of outer cassette coil portions of the same phase is inserted into a plurality of specific slots by long-pitch winding (hereinafter referred to also as "long-pitch winding slots") among the plurality of slots 15. For example, the long-pitch winding slots related to the double-wound coils 121U are slots 15-2, 15-8, 15-14, 15-20, 15-26, and 15-32.

In the double-wound coils 121U, 121V, and 121W, a pair of inner cassette coil portions of different phases is inserted into another plurality of specific slots by short-pitch winding (hereinafter referred to also as "short-pitch winding slots") among the plurality of slots. For example, the short-pitch winding slots related to the double-wound coils 121U are slots 15-1, 15-3, 15-7, 15-9, 15-13, 15-15, 15-19, 15-15-25, 15-27, 15-31, and 15-33. Among these short-pitch winding slots, the inner cassette coil portion of the double-wound coil 121W is inserted into the slot 15-1, the inner cassette coil portion of the double-wound coil 121V is inserted into the slot 15-3, the inner cassette coil portion of the double-wound coil 121W is inserted into the slot 15-7, and the inner cassette coil portion of the double-wound coil 121W is inserted into the slot 15-9. The same applies hereinafter. The inner cassette coil portions of different phases are inserted into the slot 15 in such a manner that the inner cassette coil portion related to one of the phases is located on the radially inner side and the inner cassette coil portion related to the other phase is located on the radially outer side. In this case, in four other double-wound coils 121 that overlap one double-wound coil 121 when viewed in the radial direction (or adjoin the one double-wound coil 121 in the circumferential direction), coil portions having the same circumferential length are inserted into the same slot.

According to the stator coil 12 of the present embodiment, it is possible to reduce the size of coil ends and reduce the spatial harmonics as described below with reference to FIGS. 4A to 5B.

Effects of the present embodiment will be described in detail with reference to FIGS. 4A to 5B. The following description relates to a configuration of a so-called general part, of the stator coil 12, and is not applicable to lead wires and neutral wires. In FIGS. 4A to 5B, as in the present embodiment, the number of coil pieces inserted into each slot 15 (≠ the number of coils) is assumed to be M in various comparative examples.

FIG. 4A is an explanatory diagram of a coil end configuration of the stator coil 12 of the present embodiment, showing a part of the inner peripheral portion of the stator 10 developed in a plane as in FIG. 2 above. In FIG. 4A, axial ranges of the coil ends are schematically shown by a range A1 and a range A2. The range A1 is on a lead side, and the range A2 is on a counter-lead side. FIG. 4B is an explanatory diagram of a stator coil 12' according to a first comparative example. The stator coil 12' according to the first comparative example is realized by double-layer winding similarly to the stator coil 12 of the present embodiment by using general cassette coils 121' instead of using the double-wound coils 121U, 121V, and 121W. The general cassette coil 121' is different from the double-wound coil 121 inserted into four slots 15 in that the general cassette coil 121' is inserted into two slots. In order to make a comparison under equal conditions in terms of the number of coils, it is assumed that one general cassette coil 121' has M/2 coil pieces (coil pieces inserted into the slot 15).

In the first comparative example using such a general cassette coil 121', as schematically shown in FIG. 4B, the general cassette coils 121' can be wound while being shifted slot by slot (full-pitch winding), Therefore, the number of coils is six at substantially any position in the circumferential direction, and the number of coils can be equalized. This makes it possible to reduce the size of the coil ends.

In the present embodiment, as shown in FIG. 4A, the size of the coil ends similar to that in the first comparative example shown in FIG. 4B (see rectangular ranges 402 and 403) can be realized. Specifically, in the present embodiment, the number of coils is six on both sides of each slot 15 in the axial direction as shown in dotted rectangular ranges 400 and 401. This can also be understood from the same ranges 400 and 401 shown in FIG. 1. As can be understood from FIG. 1, the number of coils is also six in a range between the slots 15 in the circumferential direction. Thus, in the present embodiment, the number of coils is six at substantially any position in the circumferential direction, and the number of coils can be equalized as in the first comparative example described above.

Figure 5A:
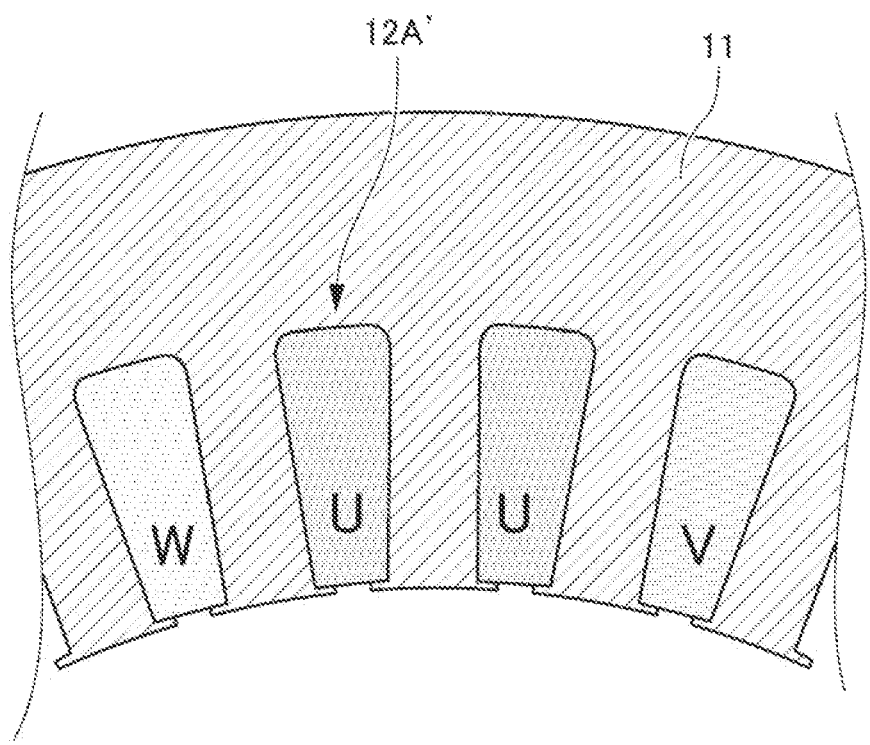
FIG. 5A is a diagram showing a configuration in slots according to a second comparative example.

FIGS. 5A and 5B are explanatory diagrams of a second comparative example. FIG. 5A is a diagram showing a configuration in slots according to the second comparative example. FIG. 5B is a diagram showing a part of an inner peripheral portion of a stator including a stator coil 12A' according to the second comparative example developed in a plane.

In the stator coil 12A' of this comparative example, double-wound coils like the double-wound coils 121 of the present embodiment are used, and outer cassette coil portions or inner cassette coil portions are arranged to overlap each other in the radial direction in such a manner that coil portions of the same phase are inserted into each slot. In this comparative example, the outer cassette coil portions or the inner cassette coil portions are arranged to overlap each other in the radial direction. Therefore, the single line in FIG. 5B represents the overlapping outer cassette coil portions or inner cassette coil portions. Therefore, in the following description, the single line in FIG. 5B is counted as "number of coils=2". One double-wound coil forming the stator coil 12A' may have M coil pieces (coil pieces inserted into the slot 15). In order to make a comparison under equal conditions in terms of the number of coils, it is assumed that one double-wound coil has M/2 coil pieces.

Since the double-wound coil 121 is realized in one piece corresponding to two pieces of the general cassette coil 121' (see FIG. 4B), the assembling efficiency is good. Further, simultaneous forming can be performed by using the same spool. Therefore, the productivity is also good. When the double-wound coils 121 are wound as shown in FIGS. 5A and 5B, however, the size of the coil ends tends to increase. Specifically, as schematically shown in FIG. 5B, the number of coils is eight on both sides of a certain slot 15 in the axial direction as shown in a dotted rectangular range 404. On both sides of another slot 15 in the axial direction, the number of coils is six as shown in a dotted rectangular range 405A. On both sides of a certain tooth 14 in the axial direction, the number of coils is four as shown in a dotted rectangular range 405B. Thus, in the stator coil 12A' according to this comparative example, the number of coils fluctuates along the circumferential direction (significant coarse and dense coil distribution occurs), and the size of the coil ends tends to increase. That is, the size of the coil ends locally increases at the location where the number of coils is eight.

FIG. 5C is an explanatory diagram of a modified example that may be realized in place of the present embodiment described above, showing a part of an inner peripheral portion of a stator including a stator coil 12" according to the present modified example developed in a plane.

The stator coil 12" according to the present modified example is realized by double-layer winding by using double-wound coils each having a circumferential length larger by one slot than that of the double-wound coil 121 of the present embodiment. The outer cassette coil portion is long-pitch winding, and the inner cassette coil portion is full-pitch winding.

According to the stator coil 12" of the present modified example, it is possible to reduce the spatial harmonics while utilizing one type of double-wound coil as in the case of the present embodiment. Since the one type of double-wound coil having a circumferential length larger by one slot than that of the double-wound coil 121 of the present embodiment is wound around the entire circumference of the stator core 11, the stator coil 12" is formed to have a plurality of phases by double-layer winding around the stator core 11. Therefore, it is possible to reduce the spatial harmonics while utilizing one type of double-wound coil.

Although the effects described above can be obtained in the stator coil 12" according to such a modified example, this modified example is disadvantageous as compared with the present embodiment from the viewpoint that the size of the coil ends tends to increase. Specifically, as schematically shown in FIG. 5C, the number of coils is eight on both sides of a certain slot 15 in the axial direction as shown in a dotted rectangular range 406. On both sides of another slot 15 in the axial direction, the number of coils is seven as shown in a dotted rectangular range 407. On both sides of a certain tooth 14 in the axial direction, the number of coils is five as shown in a dotted rectangular range 408. Thus, in the stator coil 12" according to the present modified example, the number of coils fluctuates along the circumferential direction (significant coarse and dense coil distribution occurs), and the size of the coil ends tends to increase. That is, the size of the coil ends locally increases at the location where the number of coils is eight.

According to the present embodiment, the number of coils is six at substantially any position in the circumferential direction as described above. Therefore, the number of coils can be equalized and the size of the coil ends can be reduced accordingly. Thus, according to the present embodiment, it is possible to reduce the size of the coil ends and reduce the spatial harmonics while utilizing the double-wound coils 121 that improve the productivity of the stator 10.

FIG. 5D is an explanatory diagram of a modified example that may be realized in place of the present embodiment described above, showing a part of an inner peripheral portion of a stator including double-wound coils 121V according to the present modified example developed in a plane. The double-wound coil 121V related to the V phase is shown (or described) as the double-wound coil of one phase forming the stator coil. The same applies substantially to the other two phases (U phase and W phase).

The double-wound coils according to the present modified example (double-wound coil 121V' and other similar double-wound coils of two phases) are realized by double-layer winding by using double-wound coils each having a circumferential length larger by two slots than that of the double-wound coil 121 of the present embodiment. The outer cassette coil portion is long-pitch winding, and the inner cassette coil portion is long-pitch winding.

In this case, as shown in FIG. 5D, the outer cassette coil portion of the double-wound coil 121V' is inserted into the same slot 15 as that of the outer cassette coil portion of another phase, and the inner cassette coil portions of the same phase are inserted into the same slot 15.

With the double-wound coil 121V' according to the present modified example, it is possible to reduce the spatial harmonics while utilizing one type of double-wound coil as in the case of the present embodiment. Since the one type of double-wound coil (double-wound coil 121V' and other similar double-wound coils of two phases) having a circumferential length larger by two slots than that of the double-wound coil 121 of the present embodiment is wound around the entire circumference of the stator core 11, the stator coil is formed to have a plurality of phases by double-layer winding around the stator core 11. Therefore, it is possible to reduce the spatial harmonics while utilizing one type of double-wound coil.

Next, preferred examples of the double-wound coil 121 will be described with reference to FIGS. 6 and 7. The double-wound coils 121 shown in FIGS. 6 and 7 can be structured as the double-wound coils according to the modified examples described above with reference to FIGS. 5C and 5D by varying the circumferential lengths.

Figure 6:
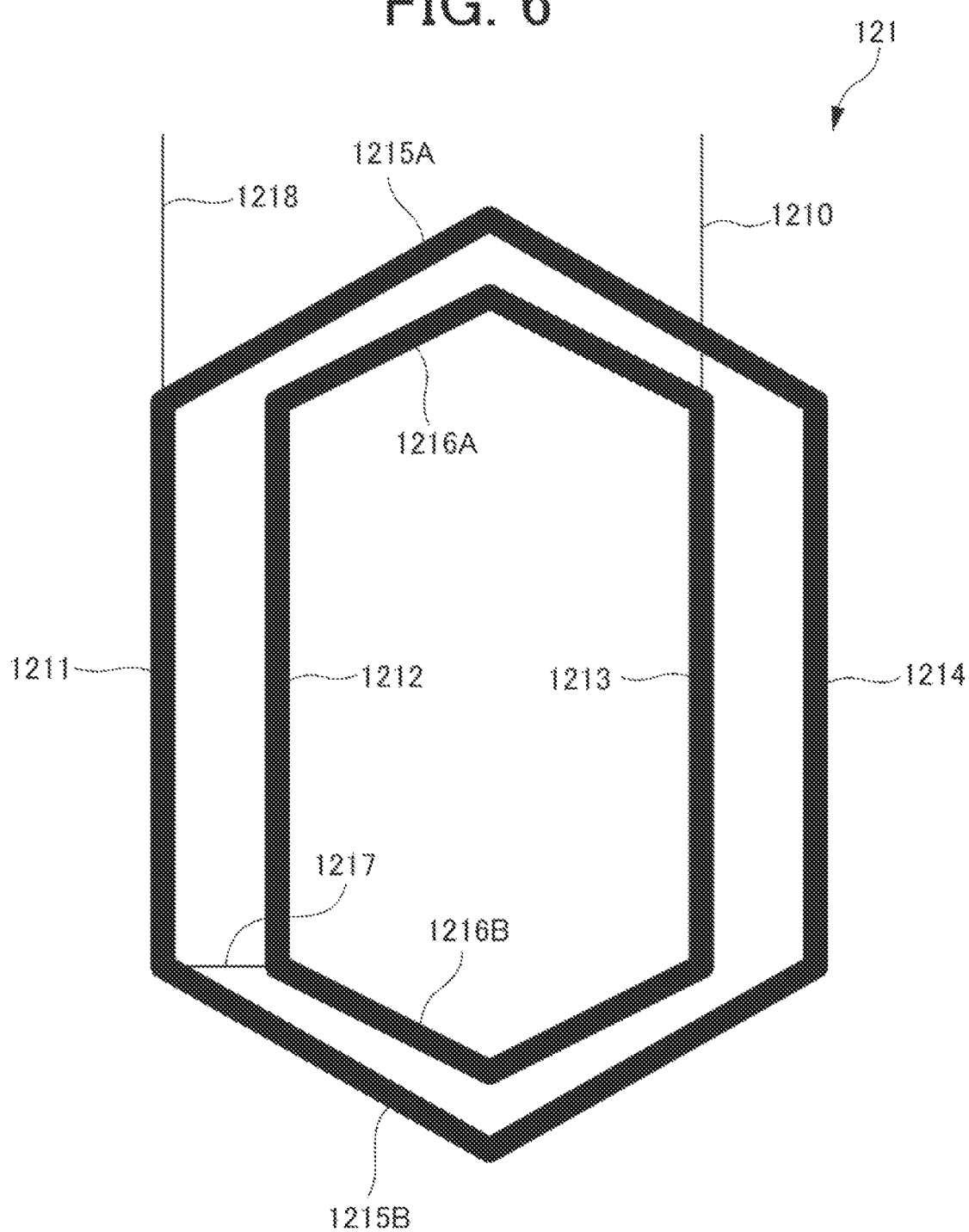
FIG. 6 is a schematic plan view of a preferred example of a double-wound coil viewed in a radial direction.

FIG. 6 is an explanatory diagram of a preferred example of the double-wound coil 121, and is a schematic plan view in the radial direction. Although one double-wound coil 121 will be described below, the same applies substantially to the other double-wound coils 121 as described above (only differences are present in parts such as crossover wires).

In the example shown in FIG. 6, the double-wound coil 121 includes a first slot insertion portion 1211, a second slot insertion portion 1212, a third slot insertion portion 1213, a fourth slot insertion portion 1214, first and second crossovers 1215A and 1215B, third and fourth crossovers 1216A and 1216B, a switching connection portion 1217, and end portions 1210 and 1218.

The double-wound coil 121 is a single piece from the end portion 1210 to the end portion 1218, and may be formed by winding one or more coil wires (the sectional shape is circular or rectangular) around the spool one or more times. The number of slot insertion portions (N, N−1) described below corresponds to the number of the coil wires. In FIG. 6, the thick line indicates a state in which the number of wires is two or more. The end portions 1210 and 1218 are bent from a linear shape shown in the figure.

The first slot insertion portion 1211, the second slot insertion portion 1212, the third slot insertion portion 1213, and the fourth slot insertion portion 1214 are portions of coil pieces inserted into the slots 15. The slots 15 into which the first slot insertion portion 1211, the second slot insertion portion 1212, the third slot insertion portion 1213, and the fourth slot insertion portion 1214 are inserted are different from each other. In the present embodiment, as described above, the center between the pair of slots 15 into which the first slot insertion portion 1211 and the fourth slot insertion portion 1214 of one double-wound coil 121 are inserted (long-pitch winding slots) coincides with the center between the pair of slots 15 into which the second slot insertion portion 1212 and the third slot insertion portion 1213 are inserted (short-pitch winding slots). In one double-wound coil 121, the slot 15 into which the first slot insertion portion 1211 is inserted (long-pitch winding slot) and the slot 15 into which the second slot insertion portion 1212 is inserted (short-pitch winding slot) are adjacent to each other in the circumferential direction, and the slot 15 into which the fourth slot insertion portion 1214 is inserted (long-pitch winding slot) and the slot 15 into which the third slot insertion portion 1213 is inserted (short-pitch winding slot) are adjacent to each other in the circumferential direction. In this case, the first slot insertion portion 1211 and the fourth slot insertion portion 1214 together with the first and second crossovers 1215A and 1215B form the outer cassette coil portion described above, and the second slot insertion portion 1212 and the third slot insertion portion 1213 together with the third and fourth crossovers 1216A and 1216B form the inner cassette coil portion described above.

For example, when the one double-wound coil 121U associated with the star mark in FIG. 1 is formed by the double-wound coil 121 shown in FIG. 6, the slot 15-8 is the long-pitch winding slot, the slot 15-7 is the short-pitch winding slot, the slot 15-3 is the short-pitch winding slot, and the slot 15-2 is the long-pitch winding slot.

The first crossover 121.5A forms the lead-side coil end (see the range A1 in FIG. 4A). In the first crossover 1215A, one side in the circumferential direction is connected to a lead-side end portion of the first slot insertion portion 1211, and the other side in the circumferential direction is connected to a lead-side end portion of the fourth slot insertion portion 1214.

The second crossover 1215B forms the counter-lead-side coil end (see the range A2 in FIG. 4A). In the second crossover 1215B, one side in the circumferential direction is connected to a counter-lead-side end portion of the first slot insertion portion 1211, and the other side in the circumferential direction is connected to a counter-lead-side end portion of the fourth slot insertion portion 1214.

The third crossover 1216A forms the lead-side coil end (see the range A1 in FIG. 4A). In the third crossover 1216A, one side in the circumferential direction is connected to a lead-side end portion of the second slot insertion portion 1212, and the other side in the circumferential direction is connected to a lead-side end portion of the third slot insertion portion 1213.

The fourth crossover 1216B forms the counter-lead-side coil end (see the range A2 in FIG. 4A), In the fourth crossover 1216B, one side in the circumferential direction is connected to a counter-lead-side end portion of the second slot insertion portion 1212, and the other side in the circumferential direction is connected to a counter-lead-side end portion of the third slot insertion portion 1213.

The switching connection portion 1217 forms a connection portion between the inner cassette coil portion and the outer cassette coil portion. Specifically, the switching connection portion 1217 is connected to an end portion of the fourth crossover 1216B close to the second slot insertion portion 1212. In the switching connection portion 1217, one side in the circumferential direction is connected to the counter-lead-side end portion of one third slot insertion portion 1213 via the fourth crossover 1216B, and the other side in the circumferential direction is connected to the counter-lead-side end portion of one first slot insertion portion 1211.

When forming a double-wound coil 121 having N first slot insertion portions 1211 as described above, the process is repeated in the order of the end portion 1210, the third slot insertion portion 1213, the fourth crossover 1216B, the second slot insertion portion 1212, the third crossover 1216A, the third slot insertion portion 1213, and the fourth crossover 1216B until N third slot insertion portions 1213 and N fourth crossovers 1216B are formed. When the N-th fourth crossover 1216E is formed, the switching connection portion 1217 is formed from the N-th fourth crossover 1216B, and then the process is also repeated in the order of the first slot insertion portion 1211, the first crossover 1215A, the fourth slot insertion portion 1214, the second crossover 1215B, the first slot insertion portion 1211, the first crossover 1215A, the fourth slot insertion portion 1214, and the second crossover 1215B until N−1 second crossovers 1215B are formed. When the (N−1)th second crossover 1215B is formed, the N-th first slot insertion portion 1211 is formed and then the end portion 1218 is formed.

According to such a double-wound coil 121, the numbers of the first slot insertion portions 1211 and the fourth slot insertion portions 1214 can be varied by one, and the numbers of the second slot insertion portions 1212 and the third slot insertion portions 1213 can be varied by one. That is, assuming that the number of the first slot insertion portions 1211 is N (≤2), the number of the fourth slot insertion portions 1214 can be N−1, the number of the second slot insertion portions 1212 can be N−1, and the number of the third slot insertion portions 1213 can be N. The switching connection portion 1217 is connected to one of the N first slot insertion portions 1211, and is connected to one of the N third slot insertion portions 1213 via the fourth crossover 1216B. Similarly, the end portions 1210 and 1218 are connected to one of the N third slot insertion portions 1213 and one of the N first slot insertion portions 1211, respectively. In a modified example, the switching connection portion 1217 may be connected to the counterlead-side end portion of one first slot insertion portion 1211 via a part of the second crossover 1215B.

In such a double-wound coil 121, the total number of coil pieces (number of coils) of the outer cassette coil portion inserted into the corresponding slots 15 and the total number of coil pieces (number of coils) of the inner cassette coil portion inserted into the corresponding slots 15 are equal to each other. That is, assuming that the number of the first slot insertion portions 1211 is N (≥2), the total number of the first slot insertion portions 1211 and the fourth slot insertion portions 1214 is 2N−1, and the total number of the second slot insertion portions 1212 and the third slot insertion portions 1213 is 2N−1. Thus, the total numbers are equal to each other.

Such a double-wound coil 121 can easily be assembled in the corresponding slots 15, for example, along the radial direction from the radially inner side to the radially outer side by using a jig (cassette inserter). In this case, the assembling of two general cassette coils 121' described above can be realized by assembling one double-wound coil 121. Therefore, the assembling efficiency can be improved.

Figure 7:
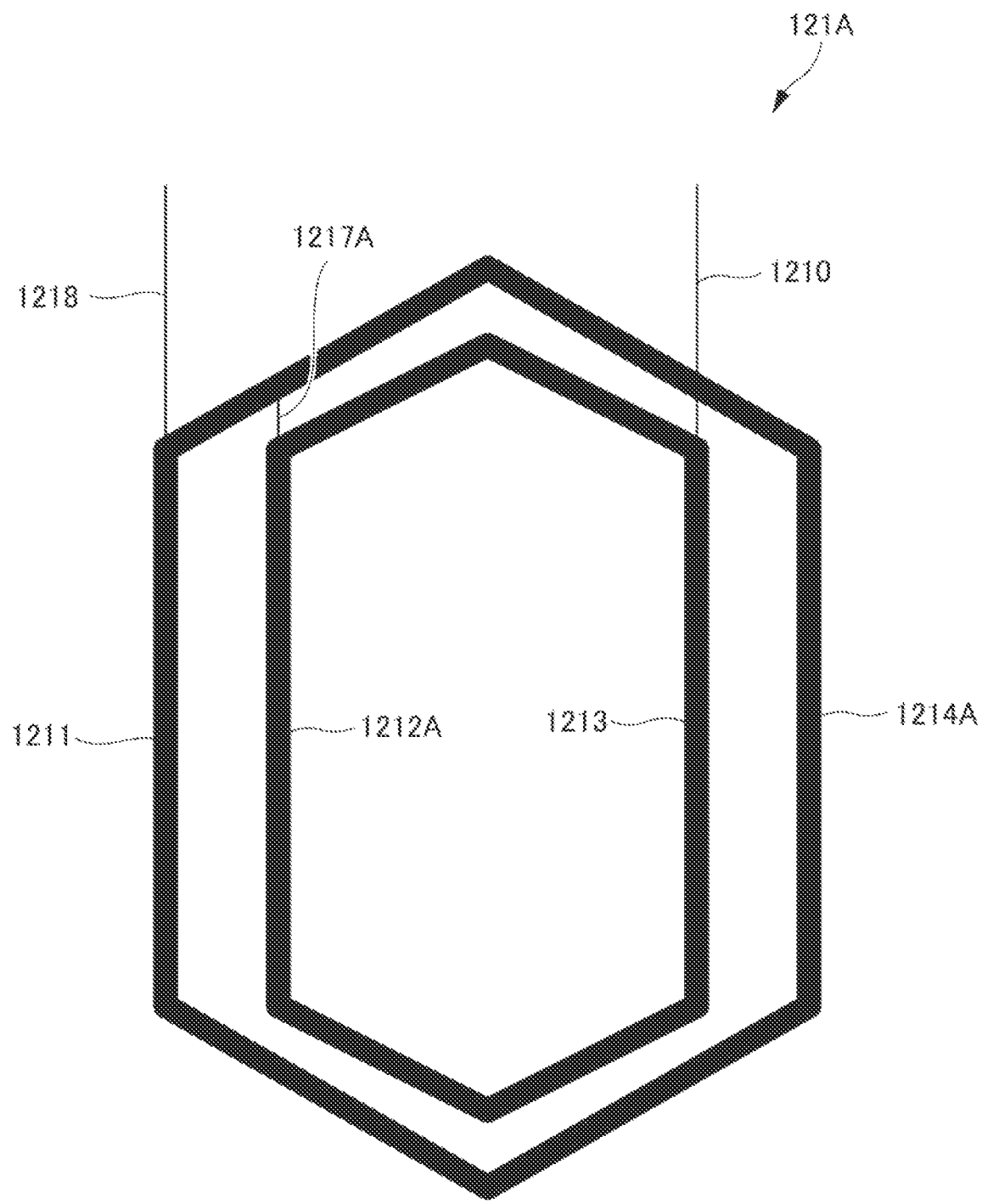
FIG. 7 is a schematic plan view of another example of the double-wound coil viewed in the radial direction.

FIG. 7 is an explanatory diagram of a double-wound coil 121A according to another example, and is a schematic plan view in the radial direction.

The double-wound coil 121A according to the other example is different from the double-wound coil 121 shown in FIG. 6 in that the second slot insertion portion 1212, the fourth slot insertion portion 1214, and the switching connection portion 1217 are replaced by a second slot insertion portion 1212A, a fourth slot insertion portion 1214A, and a switching connection portion 1217A, respectively.

In essence, the double-wound coil 121A according to the other example is different from the double-wound coil 121 shown in FIG. 6 in terms of the position of the switching connection portion 1217A. Therefore, the numbers of the first slot insertion portions 1211, the second slot insertion portions 1212A, the third slot insertion portions 1213, and the fourth slot insertion portions 1214A are equal to each other. That is, assuming that the number of the first slot insertion portions 1211 is N, the number of the fourth slot insertion portions 1214A can be N, the number of the second slot insertion portions 1212A can be N, and the number of the third slot insertion portions 1213 can be N.

In such a double-wound coil 121A, as in the double-wound coil 121 shown in FIG. 6, the total number of coil pieces (number of coils) of the outer cassette coil portion inserted into the corresponding slots 15 and the total number of coil pieces (number of coils) of the inner cassette coil portion inserted into the corresponding slots 15 are equal to each other. That is, assuming that the number of the first slot insertion portions 1211 is N (≤2), the total number of the first slot insertion portions 1211 and the fourth slot insertion portions 1214A is 2N, and the total number of the second slot insertion portions 1212A and the third slot insertion portions 1213 is 2N. Thus, the total numbers are equal to each other.

Figure 8:
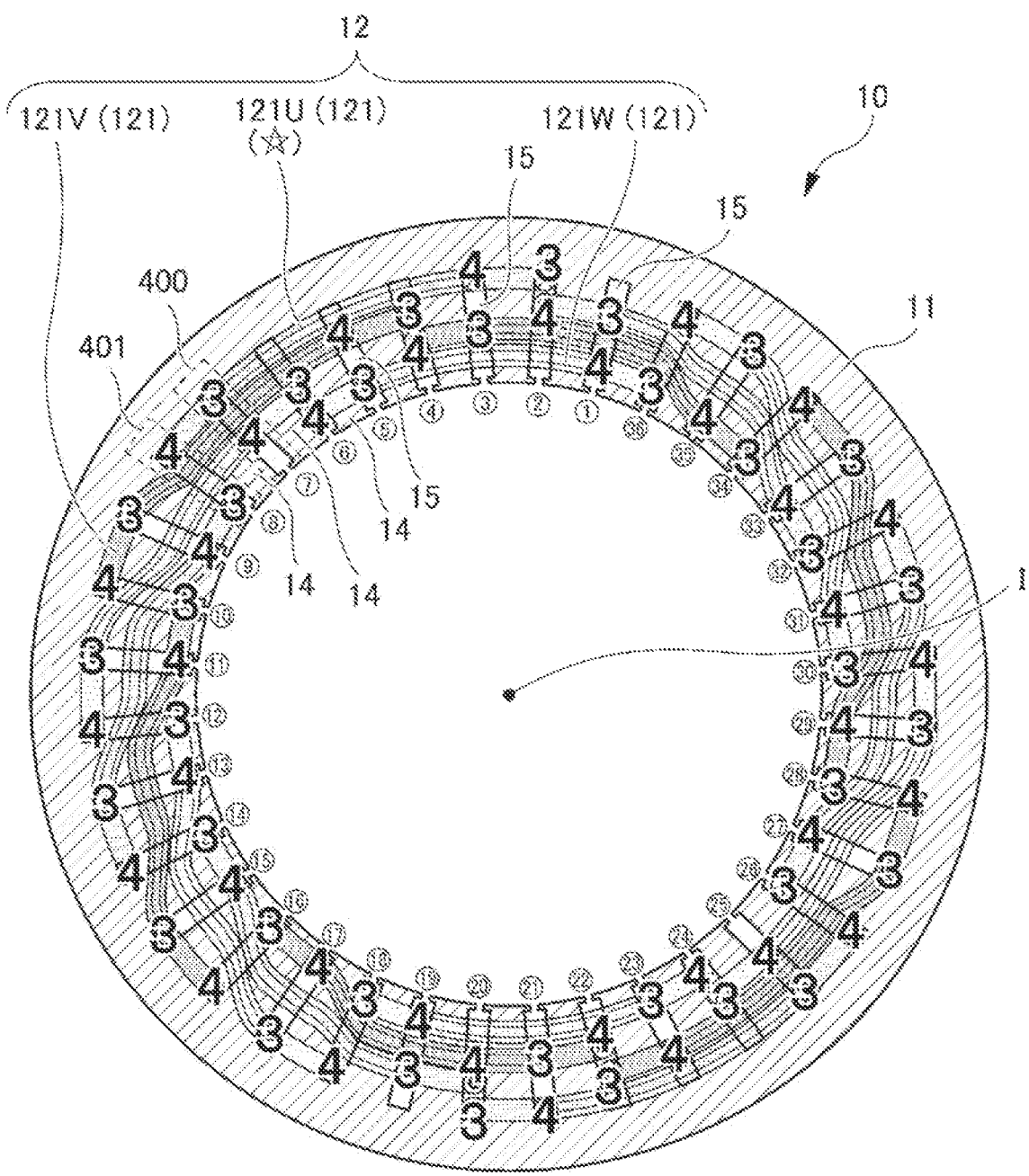
FIG. 8 is an explanatory diagram of a case where the stator coil of FIG. 1 is realized by using the double-wound coil of FIG. 6 when N=4.

FIG. 8 is an explanatory diagram of a case where the stator coil 12 of FIG. 1 is realized by using the double-wound coil 121 of FIG. 6 when N=4.

In FIG. 8, the numbers of the first slot insertion portions 1211 to the fourth slot insertion portions 1214 inserted into the slots are each represented by a numeral "3" or "4" in the figure. Since N=4 in FIG. 8, a total of seven slot insertion portions are inserted into each slot 15.

Thus, a stator 10 in which an odd number of slot insertion portions are inserted can be formed by using the double-wound coil 121 having the configuration shown in FIG. 6.

If the double-wound coil 121A having the configuration shown in FIG. 7 is used, a stator (not shown) in which an even number of slot insertion portions are inserted can be formed.

The number of slot insertion portions to be inserted into each slot 15 of the stator 10 varies depending on output characteristics and the like to be realized by the rotary electric machine including the stator 10. In general, a relatively large number of slot insertion portions are inserted into each slot 15 in a rotary electric machine having a relatively high output.

Therefore, when the double-wound coil 121 having the configuration shown in FIG. 6 is used, the configuration of the rotary electric machine can be optimized to realize a specific output characteristic. For example, the specific output characteristic is realized when a total of seven slot insertion portions as shown in FIG. 8 are inserted into each slot 15. In this case, if a configuration in which a total of six slot insertion portions are inserted into each slot 15 is realized by using the double-wound coil 121A having the configuration shown in FIG. 7, the output characteristic tends to be insufficient. If a configuration in which a total of eight slot insertion portions are inserted into each slot 15 is realized by using the double-wound coil 121A having the configuration shown in FIG. 7, the output characteristic is excessive. In such a case, such inconvenience can be prevented by using the double-wound coil 121 having the configuration shown in FIG. 6. In other words, the degree of freedom in the number of slot insertion portions that can be inserted into one slot 15 can be increased.

When the double-wound coil 121 having the configuration shown in FIG. 6 is used, N first slot insertion portions 1211 and N third slot insertion portions 1213 are formed, and the numbers of the first and second crossovers 1215A and 1215B and the third crossovers 1216A can be maintained to be N−1. As a result, the numbers of the first and second crossovers 1215A and 1215B forming the coil ends can be reduced efficiently, and the size of the coil ends can be reduced.

Second Embodiment

Figure 9:
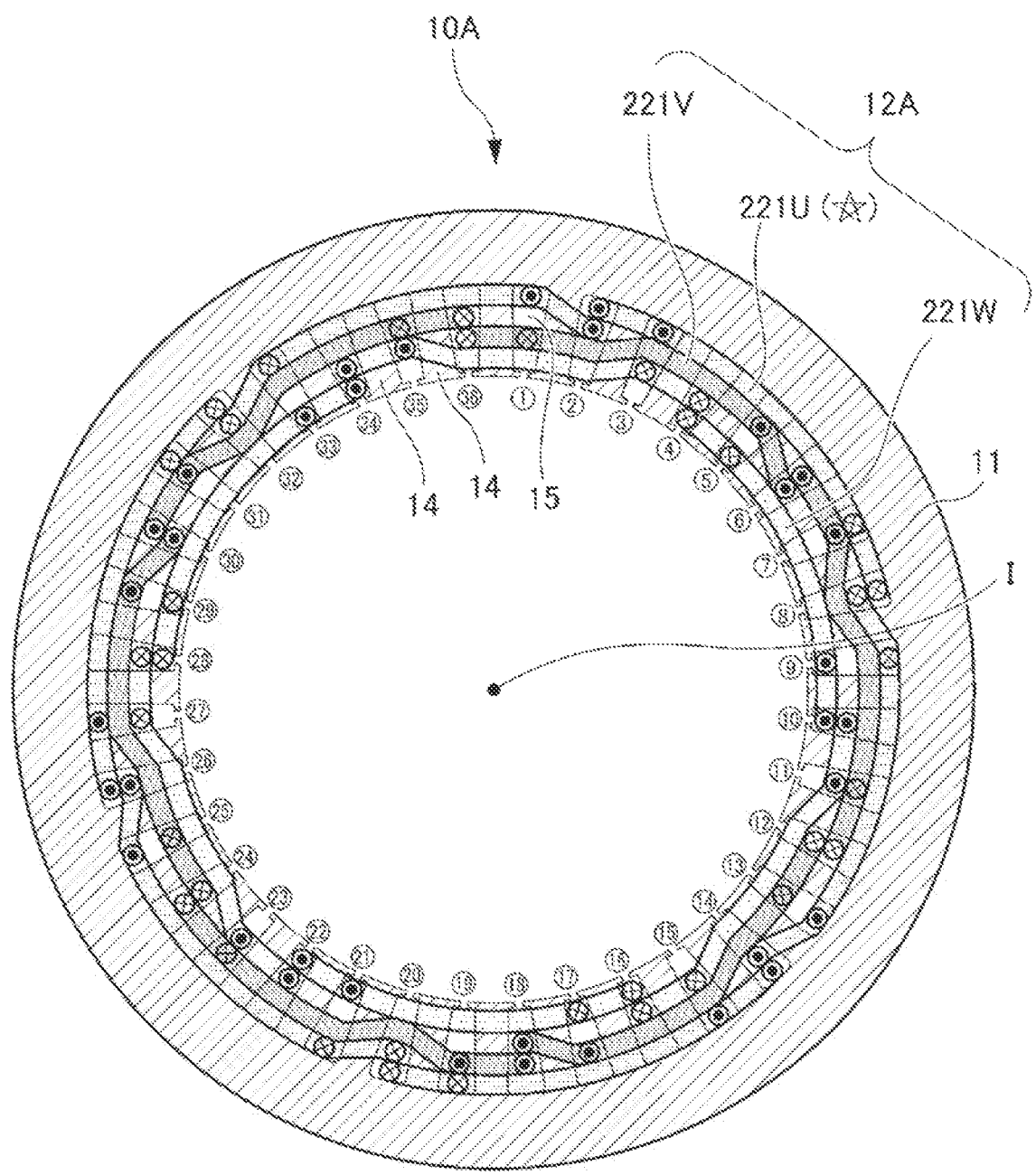
FIG. 9 is a sectional view of a stator for a rotary electric machine according to a second embodiment.

FIG. 9 is a sectional view of a stator 10A for a rotary electric machine according to an embodiment (second embodiment). In the following description of the present embodiment, the terms and symbols used in the first embodiment described above may be used without being defined again. In each figure, constituent elements that may be identical to those in the first embodiment described above may be represented by the same reference symbols and the description thereof may be omitted.

FIG. 9 shows a cross section of the stator 10A cut in a cross section perpendicular to the axial direction.

The stator 10A of the present embodiment is different from the stator 10 according to the first embodiment described above in that the stator coil 12 is replaced by a stator coil 12A.

The stator coil 12A is wound around the teeth 14 of the stator core 11 (that is, in the slots 15) in the same manner as that of the stator coil 12 according to the first embodiment described above. The stator coil 12A is wound around the stator core 11 by double-layer winding. In the same manner as that of the stator coil 12 according to the first embodiment described above, the stator coil 12A is formed of double-wound coils 221U, 221V, and 221W that are wound concentrically with different circumferential lengths for the U phase, the V phase, and the W phase. The double-wound coil 221U is for the U phase. In the present embodiment, six double-wound coils 221U are provided. Similarly, the double-wound coil 221V is for the V phase, and six double-wound coils 221V are provided. The double-wound coil 221W is for the W phase, and six double-wound coils 221W are provided. In the following, when the phases of the double-wound coils 221U, 221V, and 221W are not distinguished, they are simply referred to as "double-wound coils 221".

One double-wound coil 221 includes two concentric coil portions having a substantially hexagonal shape when viewed in the radial direction similarly to the double-wound coil 121 according to the first embodiment described above. In the present embodiment, in the two coil portions, the coil portion having a larger circumferential length (length in the circumferential direction) is hereinafter referred to also as "outer coil portion", and the coil portion having a smaller circumferential length is hereinafter referred to also as "inner coil portion".

One double-wound coil 221 is inserted into four slots 15 similarly to the double-wound coil 121 according to the first embodiment described above. That is, the outer coil portion is inserted into two slots 15, and the inner coil portion is inserted into the other two slots 15. In this case, the pair of slots 15 on the outer side in the circumferential direction sandwiches five slots 15 in the circumferential direction (that is, the outer coil portion is long-pitch winding). The pair of slots 15 on the inner side in the circumferential direction sandwiches three slots 15 in the circumferential direction (that is, the inner coil portion is short-pitch winding).

For example, in the six double-wound coils 221U, one double-wound coil 22111 associated with a star mark in FIG. 9 includes an outer coil portion inserted into the pair of slots 15-2 and 15-S on the outer side in the circumferential direction, and an inner coil portion inserted into the pair of slots 15-3 and 15-7 on the inner side in the circumferential direction. In this case, the circumferential center of the pair of slots 15-2 and 15-S on the outer side in the circumferential direction coincides with the circumferential center of the pair of slots 15-3 and 15-7 on the inner side in the circumferential direction. The center is the position of the slot 15-5. The above is basically the same for the other double-wound coils 221U and for the double-wound coils 221V and 221W.

In the double-wound coils 221 according to the present embodiment, similarly to the double-wound coils 121 according to the first embodiment described above, a pair of outer coil portions of the same phase in the double-wound coils 221U, 221V, and 221W is inserted into long-pitch winding slots among the plurality of slots 15 by long-pitch winding. For example, the long-pitch winding slots related to the double-wound coils 221U are the slots 15-2, 15-8, 15-14, 15-20, 15-26, and 15-32.

In the double-wound coils 221U, 221V, and 221W, a pair of inner coil portions of different phases is inserted into short-pitch winding slots among the plurality of slots by short-pitch winding. For example, the short-pitch winding slots related to the double-wound coils 221U are the slots 15-1, 15-3, 15-7, 15-9, 15-13, 15-15, 15-19, 15-21, 15-25, 15-27, 15-31, and 15-33. Among these short-pitch winding slots, the inner coil portion of the double-wound coil 221V is inserted into the slot 15-1, the inner coil portion of the double-wound coil 221W is inserted into the slot 15-3, the inner coil portion of the double-wound coil 221V is inserted into the slot 15-7, and the inner coil portion of the double-wound coil 221W is inserted into the slot 15-9. The same applies hereinafter.

The inner coil portions of different phases are inserted into the slot 15 in such a manner that the inner coil portion related to one of the phases is located on the radially inner side and the inner coil portion related to the other phase is located on the radially outer side. The double-wound coils 221 according to the present embodiment are different from the double-wound coils 121 according to the first embodiment described above in that, in any of the short-pitch winding slots, the inner coil portion of the double-wound coil 221U related to the U phase (an example of a first phase) is located on a radially outermost side and the inner coil portion of the double-wound coil 221W related to the W phase (an example of a third phase) is located on a radially, innermost side. As a result, in any of the short-pitch winding slots, the inner coil portion of the double-wound coil 221V related to the V phase (an example of a second phase) is located on a radially inner side of the inner coil portion of the double-wound coil 221U or located on a radially outer side of the inner coil portion of the double-wound coil 221W.

Specifically, in any of the short-pitch winding slots, the inner coil portion of the double-wound coil 221U is located on a radially outer side of the inner coil portions of the double-wound coils 221 of the other phases, that is, the inner coil portion of the double-wound coil 221V and the inner coil portion of the double-wound coil 221W.

In any of the short-pitch winding slots, the inner coil portion of the double-wound coil 221W is located on a radially inner side of the inner coil portions of the double-wound coils 221 of the other phases, that is, the inner coil portion of the double-wound coil 221U and the inner coil portion of the double-wound coil 221V.

In any of the short-pitch winding slots, the inner coil portion of the double-wound coil 221V when paired with the inner coil portion of the double-wound coil 221U is located on the radially inner side of the inner coil portion of the double-wound coil 221U, and the inner coil portion of the double-wound coil 221V when paired with the inner coil portion of the double-wound coil 2211 is located on the radially outer side of the inner coil portion of the double-wound coil 221W.

The stator coil 12A according to the present embodiment is different from the stator coil 12 according to the first embodiment described above in terms of the radial positional relationship of the respective phases regarding the pair of different phases in the short-pitch winding slot as described above. However, it is possible to reduce the size of the coil ends and reduce the spatial harmonics on the same principle as that of the first embodiment described above (the principle described with reference to FIGS. 4A to 5B).

Also in the present embodiment, the double-wound coil 221 may have the same form as that of the double-wound coil 121 according to the first embodiment described above with reference to FIGS. 6 and 7. Thus, it is possible to obtain the same effects as those of the first embodiment described above with reference to FIG. 8.

However, assembling using an inserter has effects unique to the present embodiment. This point will be described in detail with reference to FIG. 10A and subsequent figures.

Next, a method for assembling the stator coil 12A of the stator 10A of the present embodiment will be described with reference to FIG. 10A and subsequent figures. In FIG. 9 above, the numerals 1 to 36 are shown in circles in association with the 36 slots 15 as in FIG. 1, but in FIG. 11B and the like below, only the numerals 1 and 36 are shown in circles as representatives, and the numerals 2 to 35 in between are omitted.

Figure 10A:
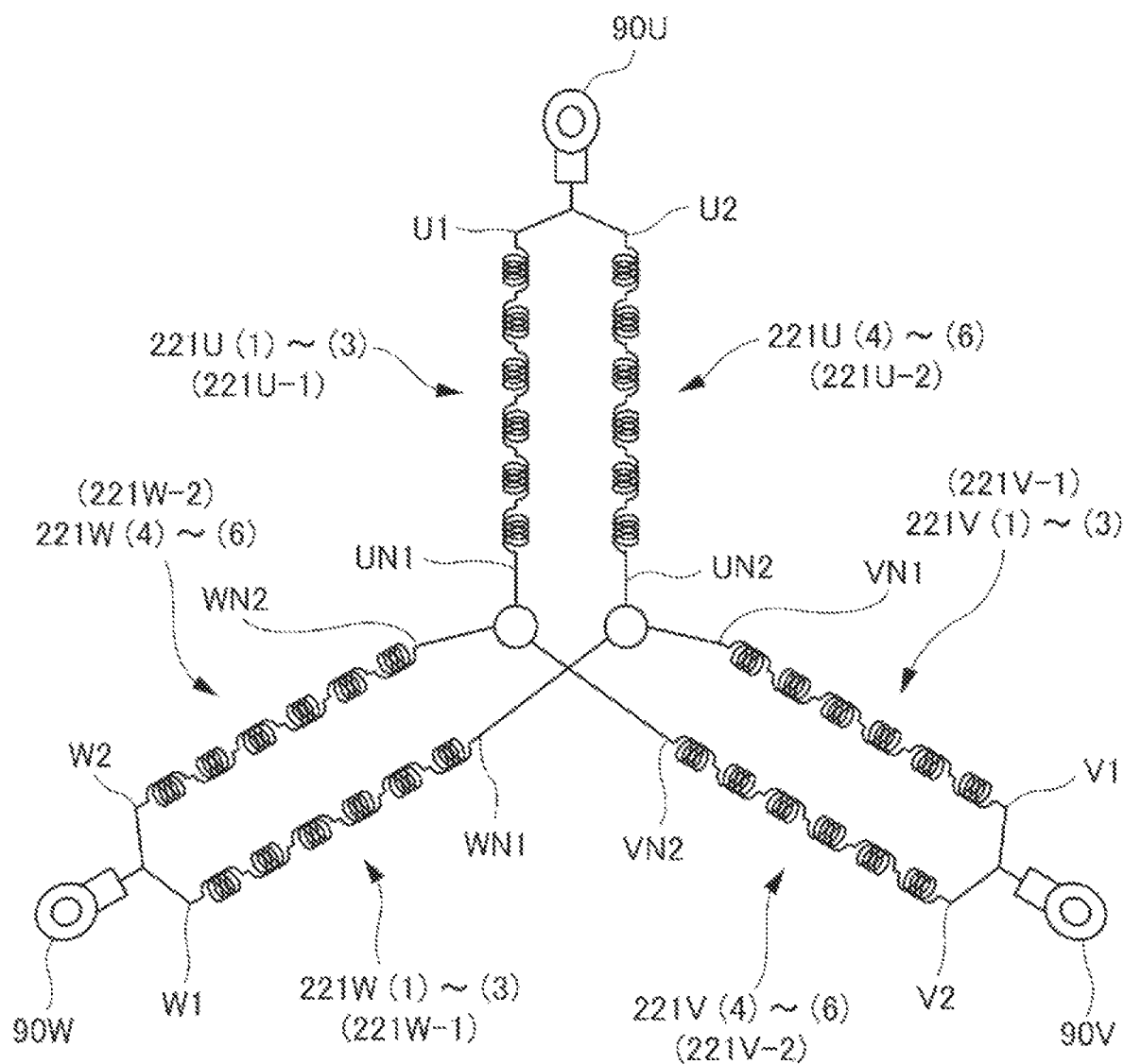
FIG. 10A is an explanatory diagram of a method for assembling a stator coil according to the second embodiment, showing an overall configuration of the stator coil.

FIG. 10A is an explanatory diagram of the method for assembling the stator coil 12A, showing an overall configuration of the stator coil 12A of the present embodiment. FIG. 10B is an explanatory diagram of the method for assembling the stator coil 12A, showing an inner peripheral portion of the stator 10 developed in a plane. In FIG. 10B, the direction CD may correspond to the circumferential direction, and a direction toward C2 may correspond to a forward rotation direction of the rotary electric machine. The same applies to FIGS. 11B and 12B described later. In FIG. 10B, the double-wound coils 221U, 221V, and 221W are schematically shown by different line types.

Figure 11A:
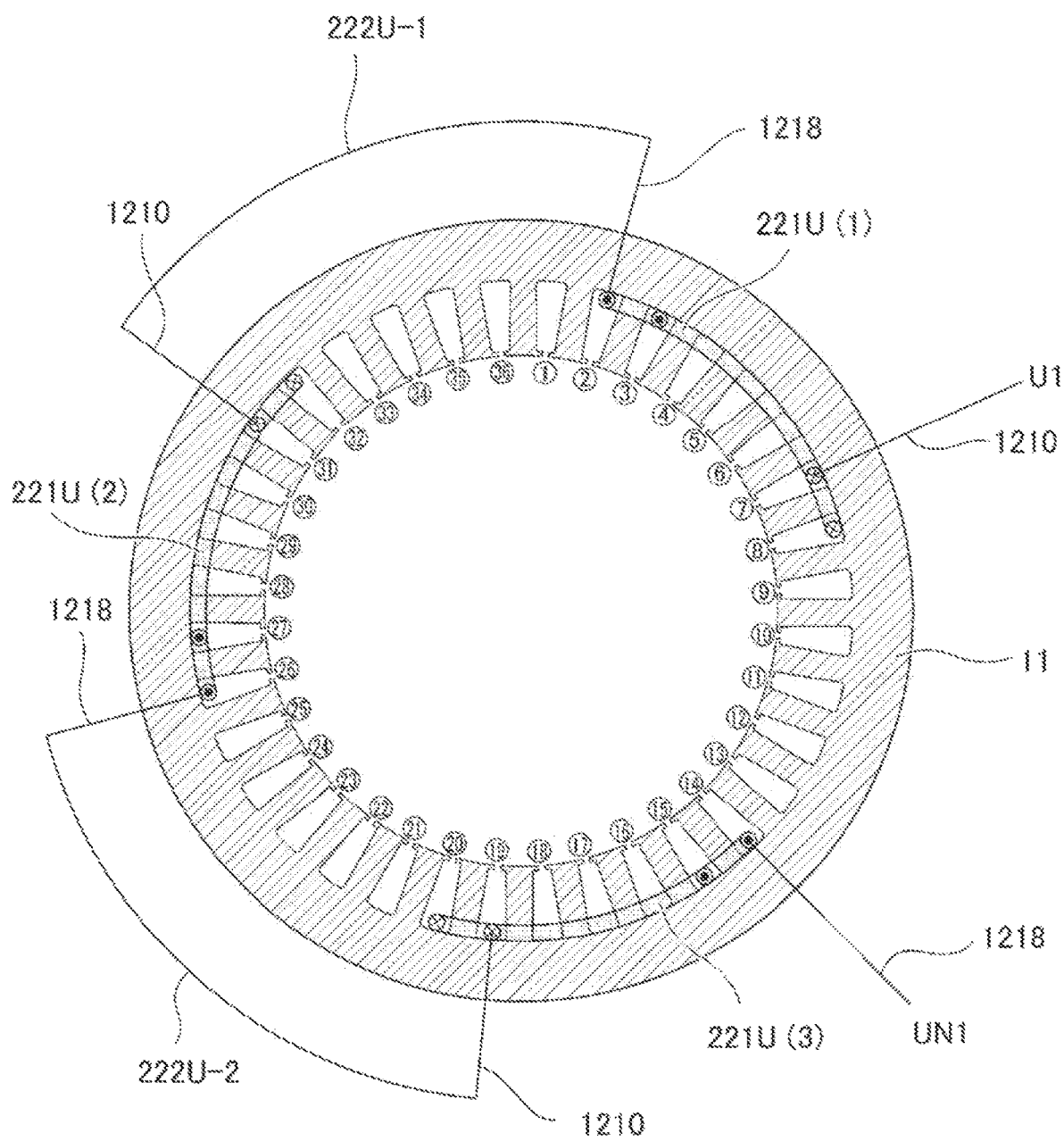
FIG. 11A is a plan view illustrating an assembling step for a first double-wound coil of a U phase according to the second embodiment.
Figure 12A:
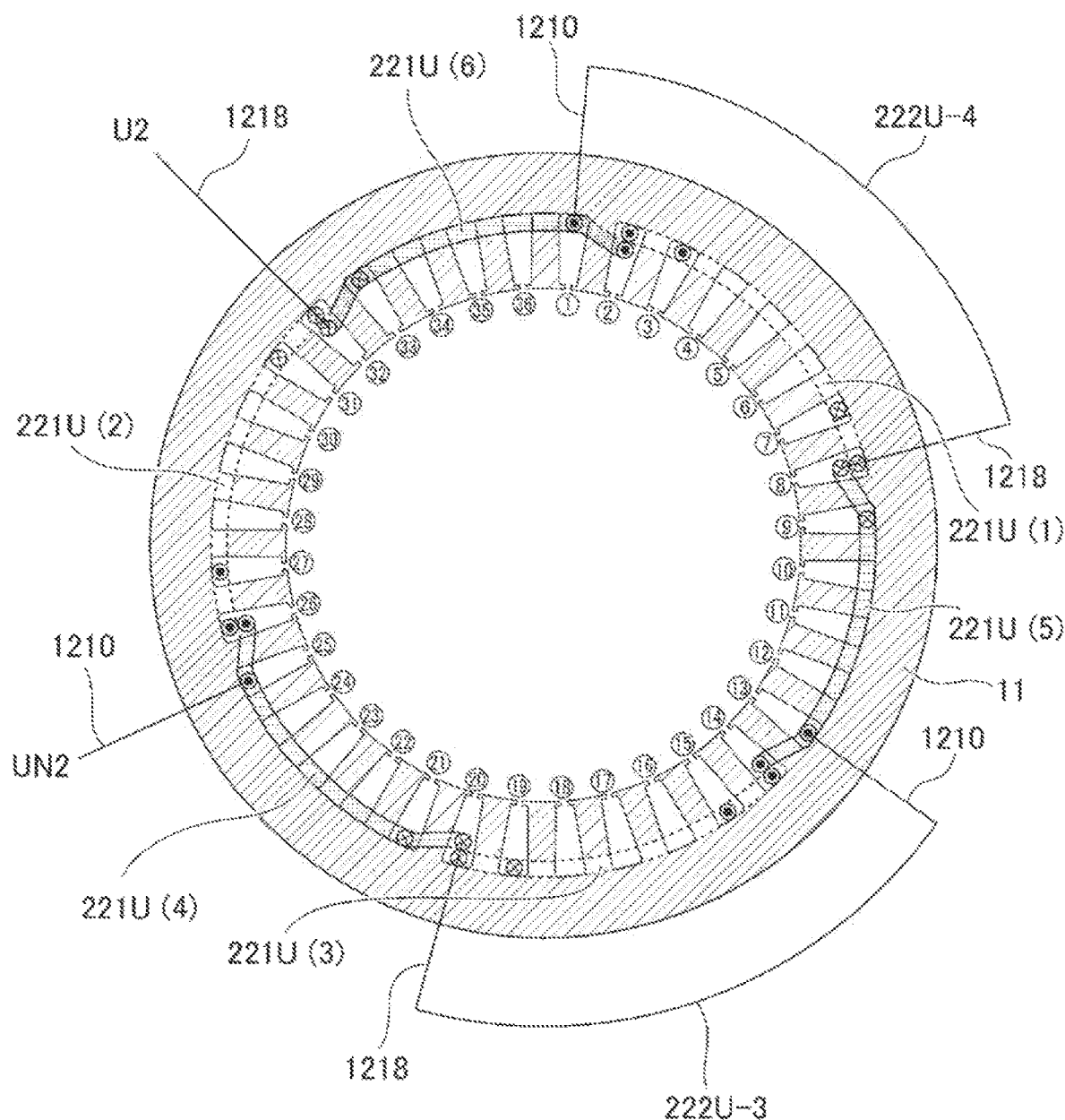
FIG. 12A is a plan view illustrating an assembling step for a second double-wound coil of the U phase according to the second embodiment.
Figure 12B:
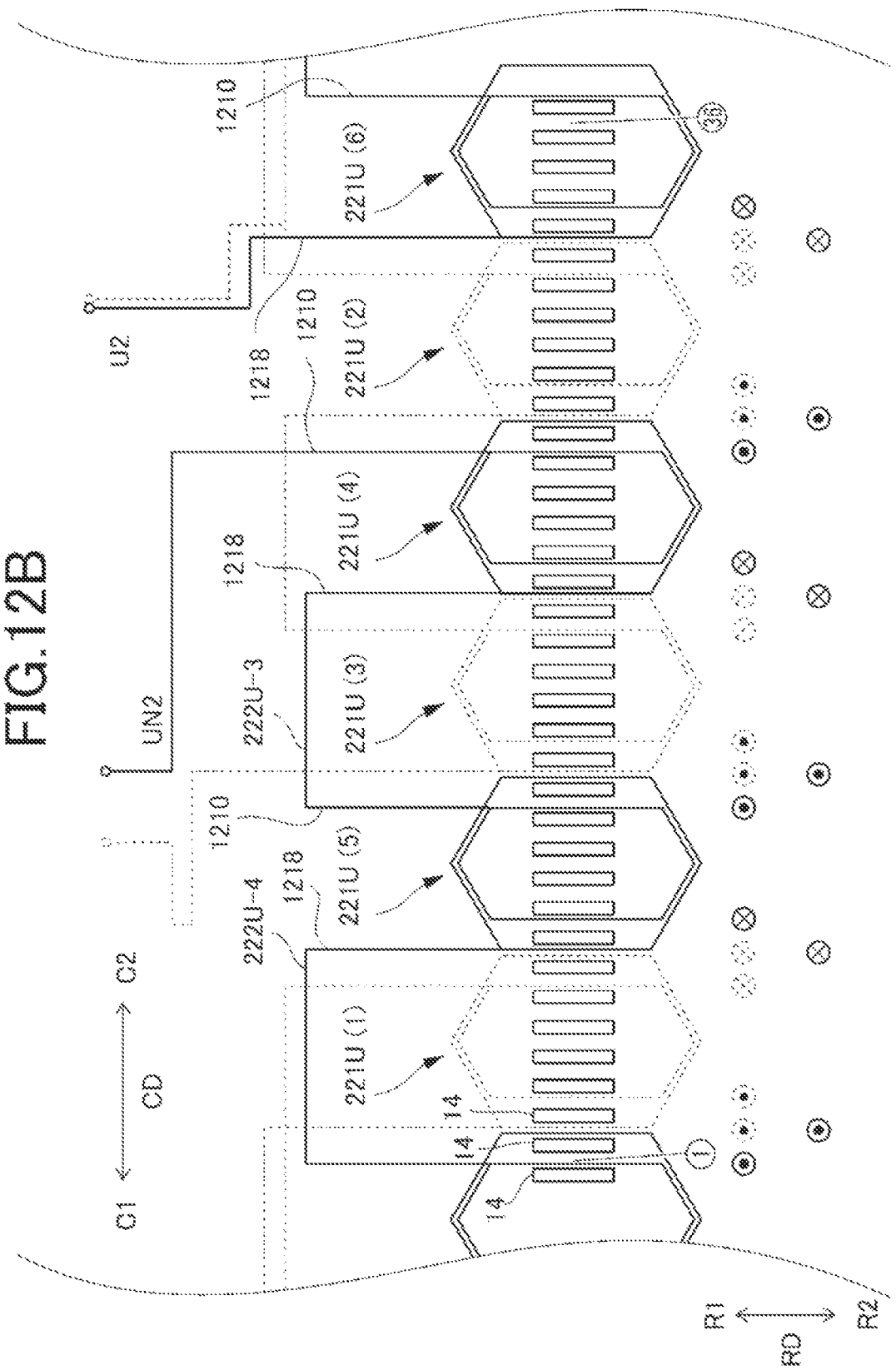
FIG. 12B is a developed view illustrating the assembling step for the second double-wound coil of the U phase according to the second embodiment.
Figure 13A:
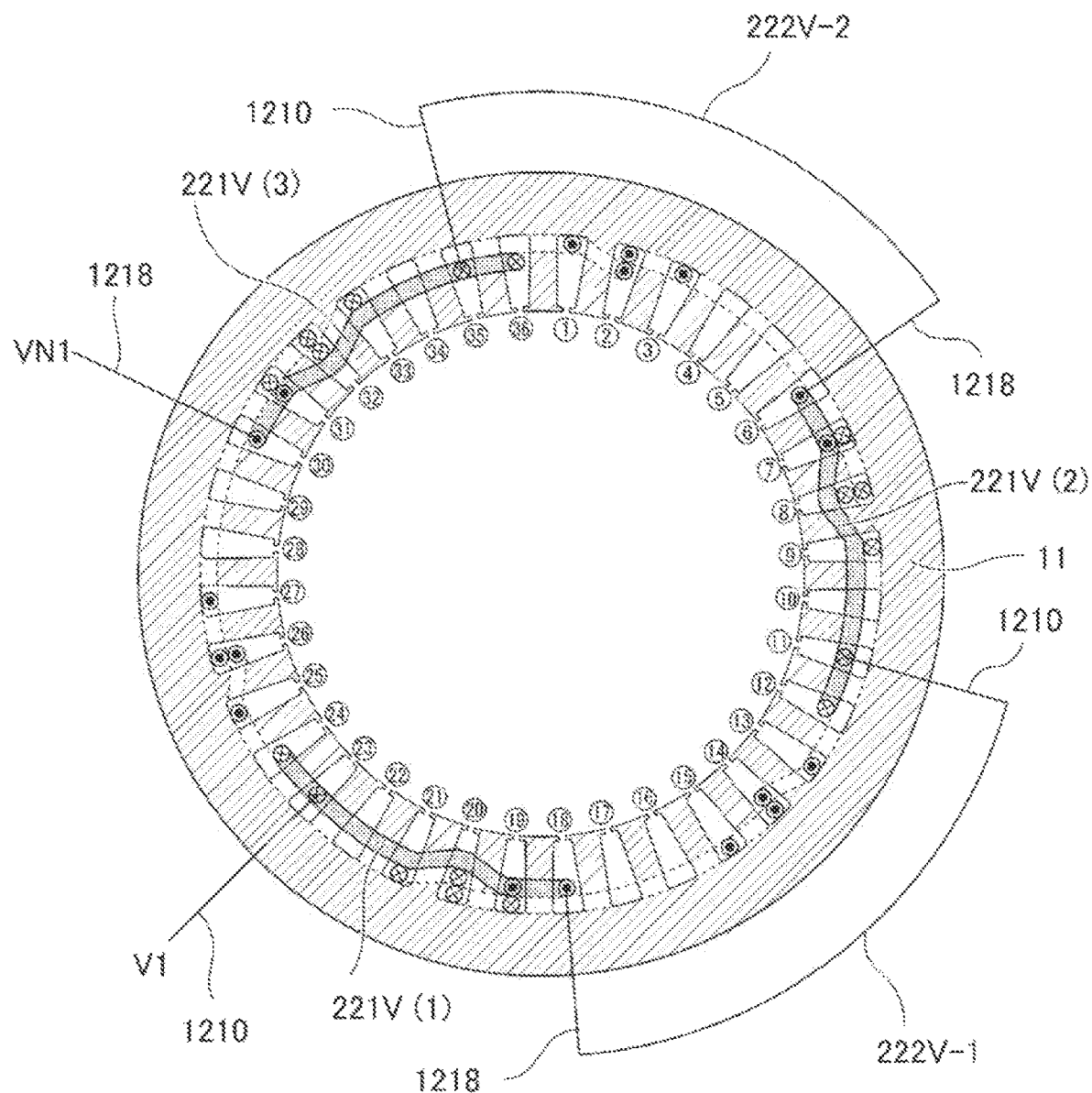
FIG. 13A is a plan view illustrating an assembling step for a first double-wound coil of a V phase according to the second embodiment.
Figure 13B:
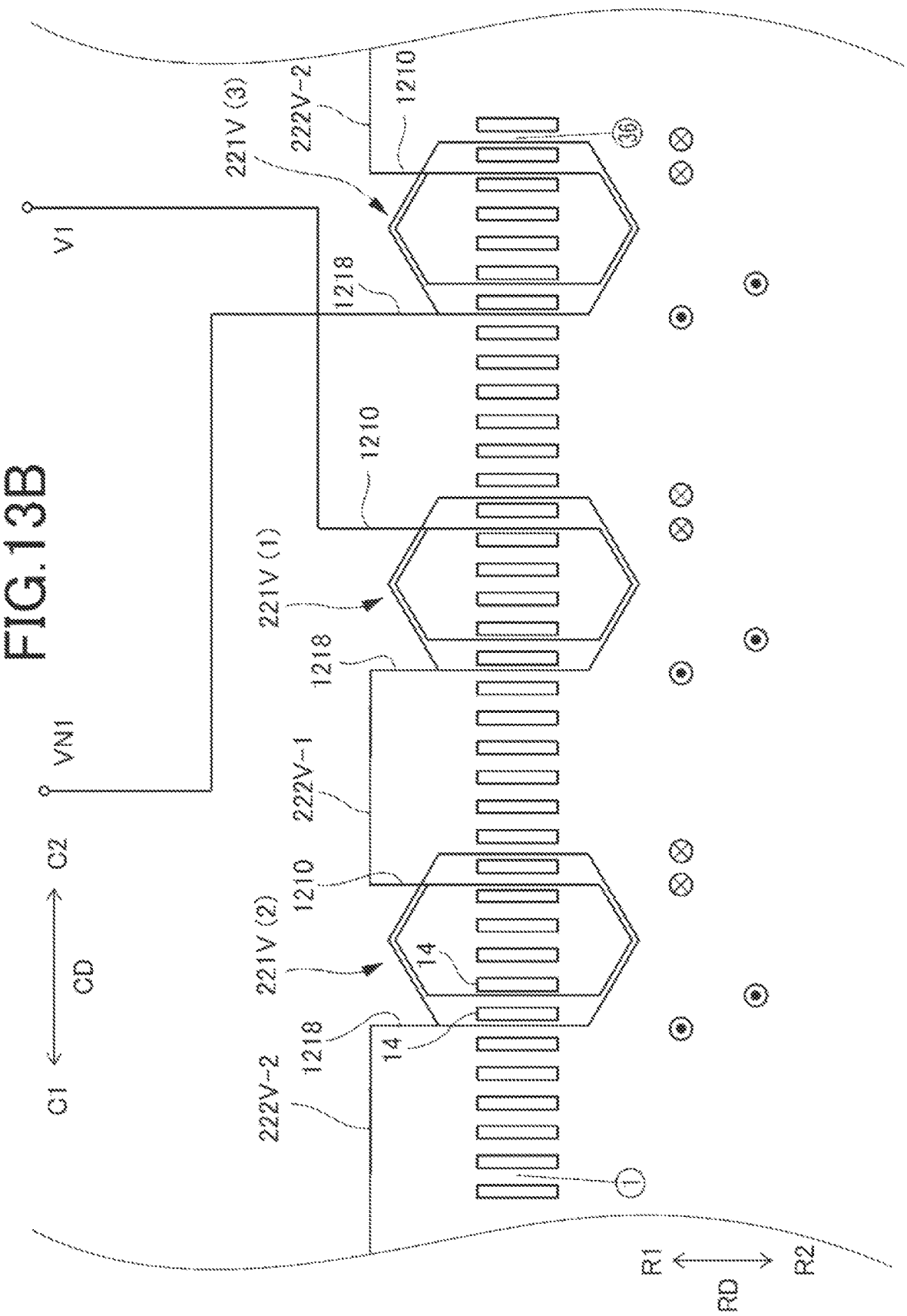
FIG. 13B is a developed view illustrating the assembling step for the first double-wound coil of the V phase according to the second embodiment.
Figure 14A:
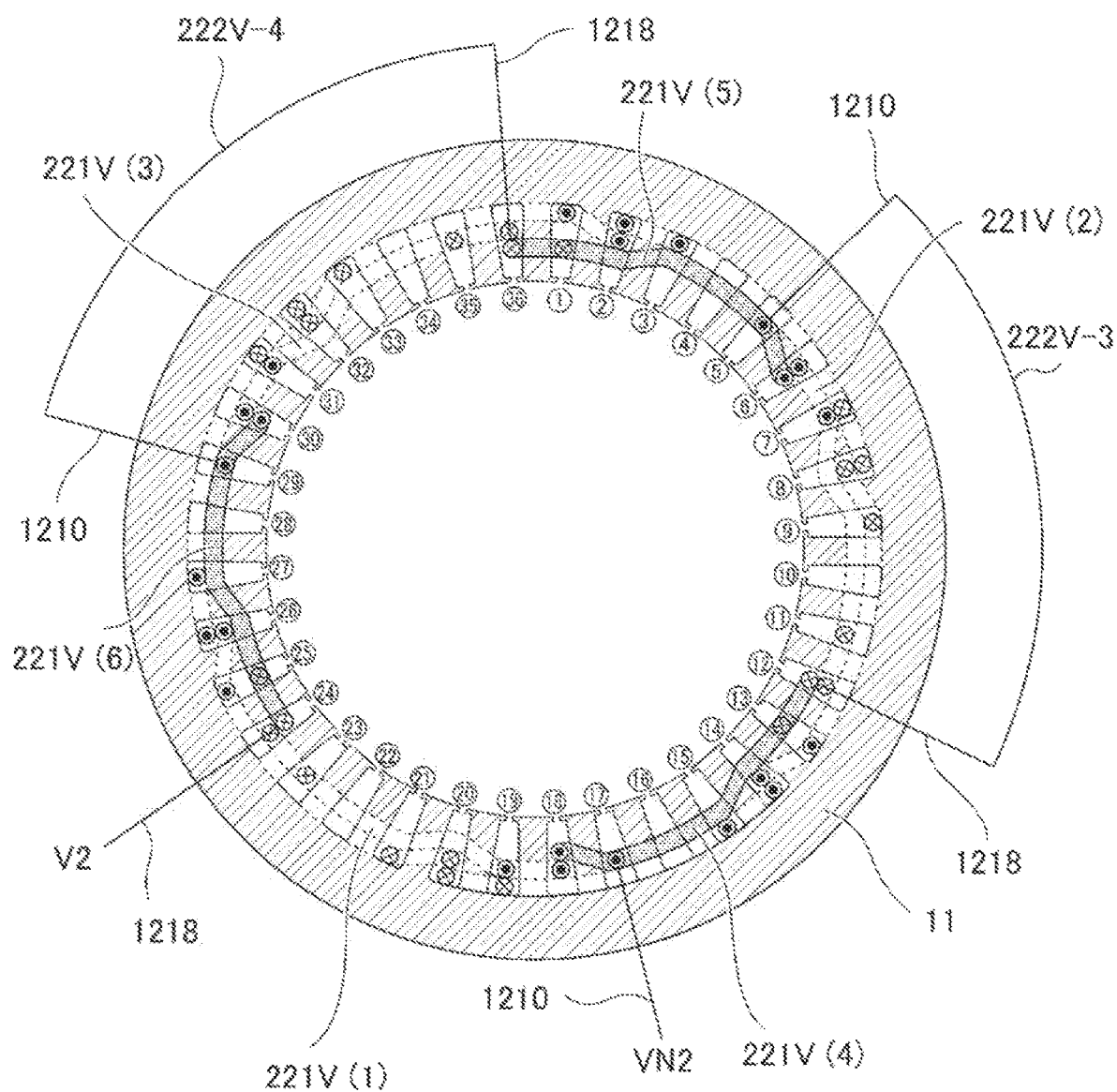
FIG. 14A is a plan view illustrating an assembling step for a second double-wound coil of the V phase according to the second embodiment.
Figure 15A:
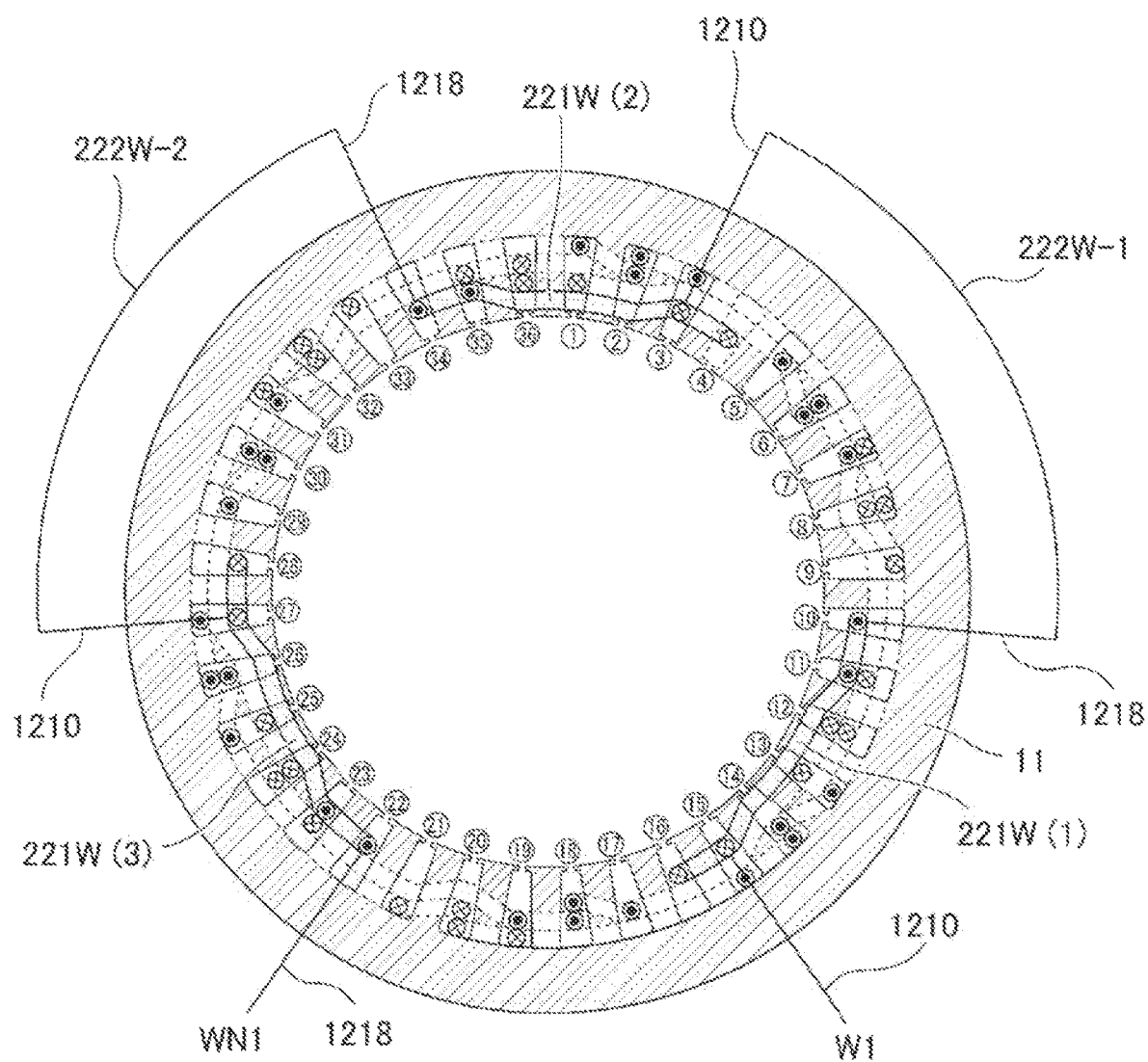
FIG. 15A is a plan view illustrating an assembling step for a first double-wound coil of a W phase according to the second embodiment.
Figure 16A:
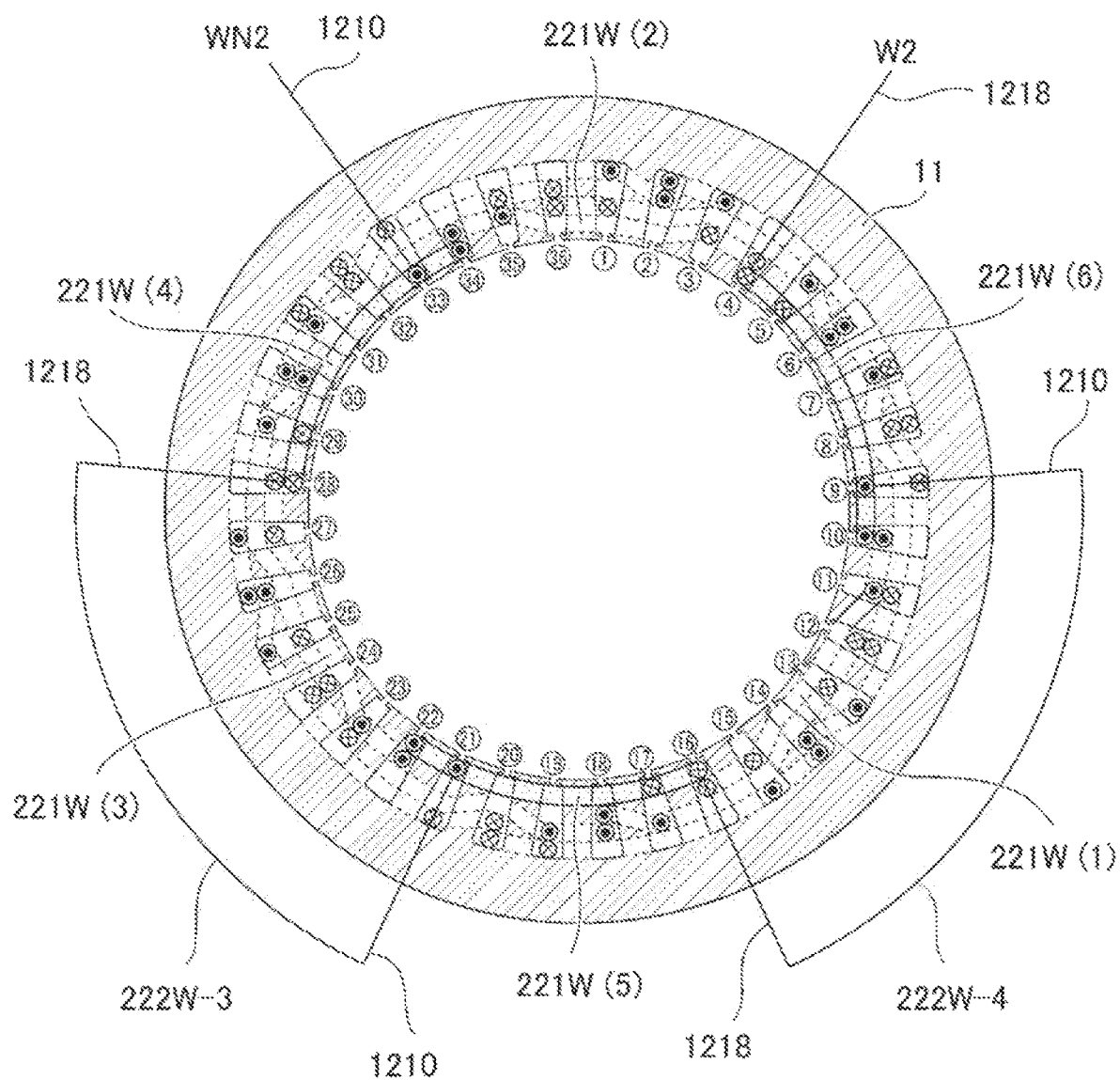
FIG. 16A is a plan view illustrating an assembling step for a second double-wound coil of the W phase according to the second embodiment.

FIGS. 11A and 11B are explanatory diagrams of an assembling step for a first double-wound coil 221U-1 of the U phase, FIGS. 12A and 12B are explanatory diagrams of an assembling step for a second double-wound coil 221U-2 of the U phase. In FIGS. 12A and 12B, the assembled first double-wound coil 221U-1 of the U phase is also shown by dotted lines. FIGS. 13A and 13B are explanatory diagrams of an assembling step for a first double-wound coil 221V-1 of the V phase. FIGS. 14A and 14B are explanatory diagrams of an assembling step for a second double-wound coil 221V-2 of the V phase. In FIGS. 13A and 14A, the assembled double-wound coils are also shown by dotted lines. In FIGS. 13B and 14B, the assembled double-wound coils 221U-1 and 221U-2 of the U phase are not shown. In FIG. 14B, the assembled first double-wound coil 221V-1 of the V phase is shown by dotted lines. FIGS. 15A and 15B are explanatory diagrams of an assembling step for a first double-wound coil 221W-1 of the W phase. FIGS. 16A and 16B are explanatory diagrams of an assembling step for a second double-wound coil 221W-2 of the W phase. In FIGS. 15A and 16A, the assembled double-wound coils are also shown by dotted lines. In FIGS. 15B and 16B, the assembled double-wound coils 221U-1 and 221U-2 of the U phase and the assembled double-wound coils 221V-1 and 221V-2 of the V phase are not shown in FIG. 16B, the assembled first double-wound coil 221W-1 of the W phase is shown by dotted lines. In FIGS. 11A, 12A, 13A, 14A, 15A, and 16A, only the double-wound coil 221 to be assembled in association with each step is hatched.

As schematically shown in FIG. 10A, the coils in the stator coil 12A are electrically connected at a neutral point of star connection in a parallel relationship of two sets for each phase. Specifically, in the stator coil 12A, two sets (pair) that are the first double-wound coil 221U-1 of the U phase and the second double-wound coil 221U-2 of the U phase are electrically connected between the neutral point and a U-phase terminal 90U on a power line side in a parallel relationship. The same applies to the other phases. In the stator coil 12A, two sets (pair) that are the first double-wound coil 221V-1 of the V phase and the second double-wound coil 221V-2 of the V phase are electrically connected between the neutral point and a V-phase terminal 90V on the power line side in a parallel relationship. In the stator coil 12A, two sets (pair) that are the first double-wound coil. 221W-1 of the W phase and the second double-wound coil 221W-2 of the W phase are electrically connected between the neutral point and a W-phase terminal 90W on the power line side in a parallel relationship.

The first double-wound coil 221U-1 of the U phase includes the three double-wound coils 221U described above (represented by 221U(1) to 221U(3)), and forms a total of six coil portions. The same applies to the second double-wound coil 221U-2 of the U phase, which includes the three double-wound coils 221U described above (represented by 221U(4) to 221U(6)). This same applies also to the other phases (V phase and W phase).

Unlike the stator coil 12 according to the first embodiment described above, the stator coil 12A of the present embodiment can be assembled in the axial direction from an axially outer side with respect to the stator core 11 by an inserter (not shown).

Specifically, the method for assembling the stator coil 12A of the present embodiment includes first assembling the first double-wound coil 221U-1 of the U phase in the axial direction from the axially outer side with respect to the stator core 11 by the inserter (not shown).

For example, when a double-wound coil 221 similar to the double-wound coil 121 or 121A shown in FIG. 6 or 7 is used, the axial assembling may be realized in such a manner that the inserter causes the first and third crossovers 1215A and 1216A of the double-wound coil 121 or 121A to move from the axially outer side with respect to the stator core 11 to reach from one side to the other side in the axial direction through the space on the radially inner side of the stator core 11. In this case, the inserter inserts the first slot insertion portion 1211, the second slot insertion portion 1212, the third slot insertion portion 1213, and the fourth slot insertion portion 1214 of the double-wound coil 121 or 121A into the slots 15 in the axial direction, causes the first and third crossovers 1215A and 1216A to reach the other side of the stator core 11, and then tilts the first and third crossovers 1215A and 1216A radially outward. Thus, the axial assembling can be completed. Alternatively, the axial assembling may be realized in such a manner that the inserter causes the second and fourth crossovers 1215B and 1216B to reach from one side to the other side in the axial direction through the space on the radially inner side of the stator core 11.

Since the three double-wound coils 221U(1) to 221U(3) of the first double-wound coil 221U-1 of the U phase can be assembled simultaneously, efficient assembling can be realized as compared with a case where the three double-wound coils 221U are separately assembled to the stator core 11.

FIGS. 11A and 11B schematically show crossover wires 222U-1 and 222U-2 that electrically connect the three double-wound coils 221U(1), 221U(2), and 221U(3) forming the first double-wound coil 221U-1 of the U phase in series. When a double-wound coil 221 similar to the double-wound coil 121 or 121A shown in FIG. 6 or 7 is used, the crossover wires 222U-1 and 222U-2 may be formed of the end portions 1210 and 1218 shown in FIG. 6 or 7. Specifically, the double-wound coil 221U(1) has the end portion 1210 forming an end point U1 connected to the U-phase terminal 90U (see FIG. 10A). The end portion 1218 of the double-wound coil 221U(1) is continuous to the end portion 1210 of the other double-wound coil 221U(2) via the crossover wire 222U-1. The end portion 1218 of the other double-wound coil 221U(2) is continuous, via the crossover wire 222U-2, to the end portion 1210 of the still other double-wound coil 221U(3) having the end portion 1218 connected to a neutral point UN1. The three double-wound coils 221U(1), 221U(2), and 221U(3) may be formed of one continuous coil wire.

Next, the method for assembling the stator coil 12A of the present embodiment includes assembling the second double-wound coil 221U-2 of the U phase in the axial direction from the axially outer side with respect to the stator core 11 by the inserter (not shown). The inserter may be in common with the inserter used when assembling the first double-wound coil 221U-1 of the U phase, and the assembling method may also be similar to that when assembling the first double-wound coil 221U-1 of the U phase. The same applies to the first double-wound coil 221V-1 of the V phase to the second double-wound coil 221W-2 of the W phase described below.

FIGS. 12A and 12B schematically show crossover wires 222U-3 and 222U-4 that electrically connect the three double-wound coils 221U(4), 221U(5), and 221U(6) forming the second double-wound coil 221U-2 of the U phase in series. When a double-wound coil 221 similar to the double-wound coil 121 or 121A shown in FIG. 6 or 7 is used, the crossover wires 222U-3 and 222U-4 may be formed of the end portions 1210 and 1218 shown in FIG. 6 or 7. Specifically, the end portion 1218 of the double-wound coil 221U (4) having the end portion 1210 connected to a neutral point UN2 is continuous to the end portion 1210 of the other double-wound coil 221U(5) via the crossover wire 222U-3. The end portion 1218 of the other double-wound coil 221U(5) is continuous to the end portion 1210 of the still other double-wound coil 221U(6) via the crossover wire 222U-4. The still other double-wound coil 221U(6) has the end portion 1218 forming an end point U2 connected to the U-phase terminal 90U (see FIG. 10A). The three double-wound coils 221U(4), 221U(5), and 221U(6) may be formed of one continuous coil wire similarly to the first double-wound coil 221U-1 of the U phase described above.

Such a second double-wound coil 2211U-2 of the U phase does not have an arrangement relationship in which the first double-wound coil 221U-1 of the U phase and the second double-wound coil 221U-2 of the U phase are staggered in the radial direction. Specifically, the second double-wound coil 221U-2 of the U phase can be inserted into the same slots 15 (long-pitch winding slots) as those of the first double-wound coil. 221U-1 of the U phase in such a manner that each outer coil portion is arranged on the radially inner side with respect to each outer coil portion related to the first double-wound coil 221U-1 of the U phase. Thus, the second double-wound coil 221U-2 of the U phase can be assembled from the radially inner side with respect to the first double-wound coil 221U-1 of the U phase and in the axial direction from the axially outer side with respect to the stator core 11 after the first double-wound coil 221U-1 of the U phase is assembled.

Therefore, the three coils 221U(4), 221U(5), and 221U(6) of the second double-wound coil 221U-2 of the U phase can be assembled simultaneously (for example, while being connected to each other) similarly to the first double-wound coil 221U-1 of the U phase described above. As a result, efficient assembling can be realized as compared with the case where the three double-wound coils 221U described above are separately assembled to the stator core 11.

In a modified example, the first double-wound coil 221U-1 of the U phase and the second double-wound coil 221U-2 of the U phase may be assembled in the axial direction from the axially outer side with respect to the stator core 11 by the inserter (not shown) in one assembling step. In this case, the first double-wound coil 221U-1 of the U phase and the second double-wound coil 221U-2 of the U phase may be set on the inserter in the form of separate coil wires or may be set on the inserter in the form of one continuous coil wire.

Next, the method for assembling the stator coil 12A of the present embodiment includes assembling the first double-wound coil 221V-1 of the V phase in the axial direction from the axially outer side with respect to the stator core 11 by the inserter (not shown). The inserter may be in common with the inserter used when assembling the first double-wound coil 221U-1 of the U phase.

FIGS. 13A and 13B schematically show crossover wires 222V-1 and 222V-2 that electrically connect the three double-wound coils 221V(1), 221V(2), and 221V(3) forming the first double-wound coil 221V-1 of the V phase in series. When a double-wound coil 221 similar to the double-wound coil 121 or 121A shown in FIG. 6 or 7 is used, the crossover wires 222V-1 and 222V-2 may be formed of the end portions 1210 and 1218 shown in FIG. 6 or 7. Specifically, the double-wound coil 221V(1) has the end portion 1210 forming an end point V1 connected to the V-phase terminal 90V (see FIG. 10A). The end portion 1218 of the double-wound coil 221V(1) is continuous to the end portion 1210 of the other double-wound coil 221V(2) via the crossover wire 222V-1. The end portion 1218 of the other double-wound coil 221V(2) is continuous, via the crossover wire 222V-2, to the end portion 1210 of the still other double-wound coil 221V(3) having the end portion 1218 connected to a neutral point VN1. The three double-wound coils 221V(1), 221V(2), and 221V(3) may be formed of one continuous coil wire.

Such a first double-wound coil 221V-1 of the V phase does not have an arrangement relationship in which the first double-wound coil 221V-1 of the V phase and the previously assembled double-wound coils 221 (that is, the first double-wound coil 221U-1 of the U phase and the second double-wound coil 221U-2 of the U phase described above) are staggered in the radial direction. Specifically, the first double-wound coil 221V-1 of the V phase can be inserted into the same slots 15 (short-pitch winding slots) as those of the first double-wound coil 221U-1 of the U phase in such a manner that one inner coil portion (second slot insertion portion 1212) of each double-wound coil 221V is arranged on the radially inner side with respect to the inner coil portion (third slot insertion portion 1213) related to the first double-wound coil 221U-1 of the U phase. Thus, after the first double-wound coil 221U-1 of the U phase and the second double-wound coil 221U-2 of the U phase are assembled, the first double-wound coil 221V-1 of the V phase can be assembled from the radially inner side with respect to those double-wound coils and in the axial direction from the axially outer side with respect to the stator core 11.

Therefore, the three double-wound coils 221V(1) 221V(2), and 221V(3) of the first double-wound coil 221V-1 of the V phase can be assembled simultaneously (for example, while being connected to each other) similarly to the first double-wound coil 221U-1 of the U phase and the second double-wound coil 221U-2 of the U phase described above. As a result, efficient assembling can be realized as compared with the case where the three double-wound coils 221V described above are separately assembled to the stator core 11.

Next, the method for assembling the stator coil 12A of the present embodiment includes assembling the second double-wound coil 221V-2 of the V phase in the axial direction from the axially outer side with respect to the stator core 11 by the inserter (not shown). The inserter may be in common with the inserter used when assembling the first double-wound coil 221U-1 of the U phase.

FIGS. 14A and 14B schematically show crossover wires 222V-3 and 222V-4 that electrically connect the three double-wound coils 221V(4), 221V(5), and 221V(6) forming the second double-wound coil 221V-2 of the V phase in series. When a double-wound coil 221 similar to the double-wound coil 121 or 121A shown in FIG. 6 or 7 is used, the crossover wires 222V-3 and 222V-4 may be formed of the end portions 1210 and 1218 shown in FIG. 6 or 7. Specifically, the end portion 1218 of the double-wound coil 221V(4) having the end portion 1210 connected to a neutral point VN2 is continuous to the end portion 1210 of the other double-wound coil 221V(5) via the crossover wire 222V-3, The end portion 1218 of the other double-wound curl 221V(5) is continuous to the end portion 1210 of the still other double-wound coil 221V(6) via the crossover wire 222V-4. The still other double-wound coil 221V(6) has the end portion 1218 forming an end point V2 connected to the V-phase terminal 90V (see FIG. 10A). The three double-wound coils 221V(4), 221V(5), and 221V(6) may be formed of one continuous coil wire similarly to the first double-wound coil 221V-1 of the V phase described above.

Such a second double-wound coil 221V-2 of the V phase does not have an arrangement relationship in which the second double-wound coil 221V-2 of the V phase and the previously assembled double-wound coils 221 (that is, the first double-wound coil 221U-1 of the U phase, the second double-wound coil 221U-2 of the U phase, and the first double-wound coil 221V-1 of the V phase described above) are staggered in the radial direction.

Specifically, the second double-wound coil 221V-2 of the V phase can be inserted into the same slots 15 (long-pitch winding slots) as those of the first double-wound coil 221V-1 of the V phase in such a manner that each outer coil portion of the double-wound coil 221V is arranged on the radially inner side with respect to each outer coil portion related to the first double-wound coil 221V-1 of the V phase. The second double-wound coil 221V-2 of the V phase can be inserted into the same slots 15 (short-pitch winding slots) as those of the second double-wound coil 221U-2 of the phase in such a manner that one inner coil portion (second slot insertion portion 1212) of each double-wound coil 221V is arranged on the radially inner side with respect to the inner coil portion (third slot insertion portion 1213) related to the second double-wound coil 221U-2 of the U phase. Thus, after the first double-wound coil 221U-1 of the U phase, the second double-wound coil 221U-2 of the U phase, and the first double-wound coil 221V-1 of the V phase are assembled, the second double-wound coil 221V-2 of the V phase can be assembled from the radially inner side with respect to those double-wound coils and in the axial direction from the axially outer side with respect to the stator core 11.

Therefore, the three double-wound coils 221V(4), 221V(5), and 221V(6) of the second double-wound coil 221V-2 of the V phase can be assembled simultaneously (for example, while being connected to each other) similarly to the first double-wound coil 221U-1 of the U phase, the second double-wound coil 221U-2 of the U phase, and the like described above. As a result, efficient assembling can be realized as compared with the case where the three double-wound coils 221V(4), 221V(5), and 221V(6) described above are separately assembled to the stator core 11.

In a modified example, the first double-wound coil 221V-1 of the V phase and the second double-wound coil 221V-2 of the V phase may be assembled in the axial direction from the axially outer side with respect to the stator core 11 by the inserter (not shown) in one assembling step. In this case, the first double-wound coil 221V-1 of the V phase and the second double-wound coil 221V-2 of the V phase may be set on the inserter in the form of separate coil wires or may be set on the inserter in the form of one continuous coil wire.

Next, the method for assembling the stator coil 12A of the present embodiment includes assembling the first double-wound coil 221W-1 of the W phase in the axial direction from the axially outer side with respect to the stator core 11 by the inserter (not shown). The inserter may be in common with the inserter used when assembling the first double-wound coil 221U-1 of the U phase.

FIGS. 15A and 15B schematically show crossover wires 222W-1 and 222W-2 that electrically connect the three double-wound coils 221W(1), 221W(2), and 221W(3) forming the first double-wound coil 221W-1 of the W phase in series. When a double-wound coil 221 similar to the double-wound coil 121 or 121A shown in FIG. 6 or 7 is used, the crossover wires 222W-1 and 222W-2 may be formed of the end portions 1210 and 1218 shown in FIG. 6 or 7. Specifically, the double-wound coil 221W(1) has the end portion 1210 forming an end point W1 connected to the W-phase terminal 90W (see FIG. 10A). The end portion 1218 of the double-wound coil 221W(1) is continuous to the end portion 1210 of the other double-wound coil 221W(2) via the crossover wire 222W-1. The end portion 1218 of the other double-wound coil 221W(2) is continuous, via the crossover wire 222W-2, to the end portion 1210 of the still other double-wound coil 221W(3) having the end portion 1218 connected to a neutral point WN1. The three double-wound coils 2214W(1), 221W(2), and 221W(3) may be formed of one continuous coil wire.

Such a first double-wound coil 221W-1 of the W phase does not have an arrangement relationship in which the first double-wound coil 221W-1 of the W phase and the previously assembled double-wound coils 221 (that is, the first double-wound coil 221U-1 of the U phase, the second double-wound coil 221U-2 of the U phase, the first double-wound coil 221V-1 of the V phase, and the second double-wound coil 221V-2 of the V phase described above) are staggered in the radial direction.

Specifically, the first double-wound coil 221W-1 of the W phase can be inserted into the same slots 15 (short-pitch winding slots) as those of the first double-wound coil 221V-1 of the V phase or the first double-wound coil 221U-1 of the U phase in such a manner that one inner coil portion (second slot insertion portion 1212) of each double-wound coil 221W is arranged on the radially inner side with respect to the inner coil portion (third slot insertion portion 1213) related to the first double-wound coil 221V-1 of the V phase and the other inner coil portion (third slot insertion portion 1213) of each double-wound coil 221\V is arranged on the radially inner side with respect to the inner coil portion (second slot insertion portion 1212) related to the first double-wound coil 221U-1 of the U phase. Thus, after the first double-wound coil 221U-1 of the U phase, the second double-wound coil 221U-2 of the U phase, the first double-wound coil 221V-1 of the V phase, and the second double-wound coil 221V-2 of the V phase are assembled, the first double-wound coil 221W-1 of the W phase can be assembled from the radially inner side with respect to those double-wound coils and in the axial direction from the axially outer side with respect to the stator core 11.

Therefore, the three double-wound coils 221W(1), 221W(2), and 221W(3) of the first double-wound coil 221W-1 of the W phase can be assembled simultaneously (for example, while being connected to each other) similarly to the first double-wound coil 221U-1 of the U phase, the second double-wound coil 221U-2 of the U phase, and the like described above. As a result, efficient assembling can be realized as compared with the case where the three double-wound coils 221W described above are separately assembled to the stator core 11.

Next, the method for assembling the stator coil 2A of the present embodiment includes assembling the second double-wound coil 221W-2 of the W phase in the axial direction from the axially outer side with respect to the stator core 11 by the inserter (not shown). The inserter may be in common with the inserter used when assembling the first double-wound coil 221U-1 of the U phase.

FIGS. 16A and 16B schematically show crossover wires 222W-3 and 222W-4 that electrically connect the three double-wound coils 221W(4), 221W(5), and 221W(6) forming the second double-wound coil 221W-2 of the W phase in series. When a double-wound coil 221 similar to the double-wound coil 121 or 121A shown in FIG. 6 or 7 is used, the crossover wires 222W-3 and 222W-4 may be formed of the end portions 1210 and 1218 shown in FIG. 6 or 7. Specifically, the end portion 1218 of the double-wound coil 221W(4) having the end portion 1210 connected to a neutral point WN2 is continuous to the end portion 1210 of the other double-wound coil 221W(5) via the crossover wire 222W-3. The end portion 1218 of the other double-wound coil 221W(5) is continuous to the end portion 1210 of the still other double-wound coil 221W(6) via the crossover wire 222W-4. The still other double-wound coil 221W(6) has the end portion 1218 forming an end point W2 connected to the W-phase terminal 9011 (see FIG. 10A). The three double-wound coils 221W(4), 221W(5), and 221W(6) may be formed of one continuous coil wire similarly to the first double-wound coil 221W-1 of the W phase described above.

Such a second double-wound coil 221W-2 of the W phase does not have an arrangement relationship in which the second double-wound coil 221W-2 of the W phase and the previously assembled double-wound coils 221 (that is, the first double-wound coil 221U-1 of the U phase, the second double-wound coil 221U-2 of the U phase, the first double-wound coil 221V-1 of the V phase, the second double-wound coil 221V-2 of the V phase, and the first double-wound coil 221W-1 of the W phase described above) are staggered in the radial direction.

Specifically, the second double-wound coil 221W-2 of the W phase can be inserted into the same slots 15 (long-pitch winding slots) as those of the first double-wound coil 221W-1 of the W phase in such a manner that each outer coil portion of the double-wound coil 221W is arranged on the radially inner side with respect to each outer coil portion related to the first double-wound coil 221W-1 of the W phase. The second double-wound coil 221W-2 of the W phase can be inserted into the same slots 15 (short-pitch winding slots) as those of the second double-wound coil 221U-2 of the U phase or the second double-wound coil 221V-2 of the V phase in such a manner that one inner coil portion (third slot insertion portion 1213) of each double-wound coil 221W is arranged on the radially inner side with respect to the inner coil portion (second slot insertion portion 1212) related to the second double-wound coil 221U-2 of the U phase and the other inner coil portion (second slot insertion portion 1212) of each double-wound coil 221W is arranged on the radially inner side with respect to the inner coil portion (third slot insertion portion 1213) related to the second double-wound coil 221V-2 of the V phase. Thus, after the first double-wound coil 221U-1 of the U phase, the second double-wound coil 221U-2 of the U phase, the first double-wound coil 221V-1 of the V phase, the second double-wound coil 221V-2 of the V phase, and the first double-wound coil 221W-1 of the W phase are assembled, the second double-wound coil 221W-2 of the W phase can be assembled from the radially inner side with respect to those double-wound coils and in the axial direction from the axially outer side with respect to the stator core 11.

Therefore, the three double-wound coils 221W(4), 221W(5), and 221W(6) of the second double-wound coil 221W-2 of the W phase can be assembled simultaneously (for example, while being connected to each other) similarly to the second double-wound coil 221U-2 of the U phase and the like described above. As a result, efficient assembling can be realized as compared with the case where the three double-wound coils 221W(4), 221W(5), and 221W(6) described above are separately assembled to the stator core 11.

In a modified example, the first double-wound coil 221W-1 of the W phase and the second double-wound coil 221W-2 of the W phase may be assembled in the axial direction from the axially outer side with respect to the stator core 11 by the inserter (not shown) in one assembling step. In this case, the first double-wound coil 221W-1 of the W phase and the second double-wound coil 221W-2 of the W phase may be set on the inserter in the form of separate coil wires or may be set on the inserter in the form of one continuous coil wire.

Thus, according to the present embodiment, the first double-wound coil 221U-1 of the U phase, the second double-wound coil 221U-2 of the U phase, the first double-wound coil 221V-1 of the V phase, the second double-wound coil 221V-2 of the V phase, the first double-wound coil 221W-1 of the W phase, and the second double-wound coil 221W-2 of the W phase can be assembled in this order, and can be assembled in the axial direction from the axially outer side with respect to the stator core 11 by the inserter. Therefore, the first double-wound coil 221U-1 of the U phase, the second double-wound coil 221U-2 of the U phase, the first double-wound coil 221V-1 of the V phase, the second double-wound coil 221V-2 of the V phase, the first double-wound coil 221W-1 of the W phase, and the second double-wound coil 221W-2 of the W phase can be assembled efficiently by one assembling operation of the inserter. In a modified example, the first double-wound coil 221U-1 of the U phase and the second double-wound coil 221U-2 of the U phase may be assembled by one assembling operation of the inserter, the first double-wound coil 221V-1 of the V phase and the second double-wound coil 221V-2 of the V phase may be assembled by one assembling operation of the inserter, and the first double-wound coil 221W-1 of the W phase and the second double-wound coil 221W-2 of the W phase may be assembled by one assembling operation of the inserter. Thus, the assembling efficiency can be maximized.

Although each embodiment has been described in detail above, the present disclosure is not limited to the specific embodiments, and various modifications and changes can be made within the scope of the claims. Further, it is possible to combine all or a plurality of the constituent elements of the embodiments described above.

DESCRIPTION OF THE REFERENCE NUMERALS 10, 10A . . . stator, 11 stator core, 12, 12A . . . stator coil, 15 . . . slot. 121, 121A, 221 . . . double-wound coil, 1211 first slot insertion portion, 1212, 1212A . . . second slot insertion portion, 1213 . . . third slot insertion portion, 1214, 1214A . . . fourth slot insertion portion, 1215A . . . first crossover, 1215B . . . second crossover, 1216A . . . third crossover, 1216B . . . fourth crossover, 1217, 1217A . . . connection portion

The invention claimed is:

1. A stator for a rotary electric machine, the stator comprising:
   a stator core having a plurality of slots; and
   a multi-phase stator coil wound around the stator core by double-layer winding, wherein
   the multi-phase stator coil is formed by winding a plurality of double-wound coils around an entire circumference of the stator core for each phase, each of the double-wound coils being wound concentrically with different circumferential lengths,
   each of the double-wound coils is formed of a coil portion having a larger circumferential length and a coil portion having a smaller circumferential length,
   in one of the double-wound coils, a total number of coil pieces inserted into the plurality of slots for the coil portion having the larger circumferential length and a total number of coil pieces inserted into the plurality of slots for the coil portion having the smaller circumferential length are equal to each other, and
   in each pair of the double-wound coils adjacent to each other in a circumferential direction, coil portions having a same circumferential length are inserted into a same slot of the plurality of slots.

2. The stator for the rotary electric machine according to claim 1, wherein:
   a pair of the coil portions having the larger circumferential length in the same phase is inserted into a long-pitch winding slot among the plurality of slots by long-pitch winding;
   a pair of the coil portions having the smaller circumferential length in different phases is inserted into a short-pitch winding slot among the plurality of slots by short-pitch winding;
   one of the double-wound coils includes
      a first slot insertion portion inserted into one of the long-pitch winding slots,
      a second slot insertion portion inserted into one of the short-pitch winding slots,
      a third slot insertion portion inserted into another one of the short-pitch winding slots,
      a fourth slot insertion portion inserted into another one of the long-pitch winding slots,
      a first crossover in which one side in the circumferential direction is connected to a lead-side end portion of the first slot insertion portion and the other side in the circumferential direction is connected to a lead-side end portion of the fourth slot insertion portion,
      a second crossover in which one side in the circumferential direction is connected to a counter-lead-side end portion of the first slot insertion portion and the other side in the circumferential direction is connected to a counter-lead-side end portion of the fourth slot insertion portion,
      a third crossover in which one side in the circumferential direction is connected to a lead-side end portion of the second slot insertion portion and the other side in the circumferential direction is connected to a lead-side end portion of the third slot insertion portion, and
      a fourth crossover in which one side in the circumferential direction is connected to a counter-lead-side end portion of the second slot insertion portion and the other side in the circumferential direction is connected to a counter-lead-side end portion of the third slot insertion portion;
   the first slot insertion portion, the fourth slot insertion portion, the first crossover, and the second crossover form the coil portion having the larger circumferential length in the one of the double-wound coils, and the second slot insertion portion, the third slot insertion portion, the third crossover, and the fourth crossover form the coil portion having the smaller circumferential length in the one of the double-wound coils; and
   a center between a pair of the long-pitch winding slots into which the first slot insertion portion and the fourth slot insertion portion of the one of the double-wound coils are inserted coincides with a center between a pair of the short-pitch winding slots into which the second slot insertion portion and the third slot insertion portion of the one of the double-wound coils are inserted.

3. The stator for the rotary electric machine according to claim 2, wherein the one of the double-wound coils includes N (N≥2) pieces of the first slot insertion portion and N pieces of the third slot insertion portion, and includes N−1 pieces of the second slot insertion portion and N−1 pieces of the fourth slot insertion portion.

4. The stator for the rotary electric machine according to claim 3, wherein the long-pitch winding slot and the short-pitch winding slot into which the first slot insertion portion and the second slot insertion portion of the one of the double-wound coils are inserted, respectively, are adjacent to each other in the circumferential direction, and the long-pitch winding slot and the short-pitch winding slot into which the fourth slot insertion portion and the third slot insertion portion of the one of the double-wound coils are inserted, respectively, are adjacent to each other in the circumferential direction.

5. The stator for the rotary electric machine according to claim 4, wherein:
   the one of the double-wound coils further includes a switching connection portion; and
   in the switching connection portion, one side in the circumferential direction is connected, via the one fourth crossover, to the counter-lead-side end portion of the one third slot insertion portion among the N pieces of the third slot insertion portion, and the other side in the circumferential direction is connected to the counter-lead-side end portion of the one first slot insertion portion among the N pieces of the first slot insertion portion.

* * * * *